US012587605B2

(12) United States Patent　　　　(10) Patent No.:　US 12,587,605 B2
Otake et al.　　　　　　　　　　　　(45) Date of Patent:　Mar. 24, 2026

(54) SERVICE PROVIDING SYSTEM WITH SYNCHRONIZATION OF ATTRIBUTE DATA

(71) Applicant: FUJIFILM Business Innovation Corp., Tokyo (JP)

(72) Inventors: Shin Otake, Kanagawa (JP); Tatsuro Suzuki, Kanagawa (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 359 days.

(21) Appl. No.: 18/157,430

(22) Filed: Jan. 20, 2023

(65) Prior Publication Data

US 2024/0007574 A1　　Jan. 4, 2024

(30) Foreign Application Priority Data

Jul. 1, 2022　(JP) ................................. 2022-107208

(51) Int. Cl.
H04N 1/32　　　　(2006.01)
(52) U.S. Cl.
CPC ..... H04N 1/32122 (2013.01); H04N 1/32566 (2013.01)
(58) Field of Classification Search
USPC ........................................................ 358/1.13
See application file for complete search history.

(56) References Cited

U.S. PATENT DOCUMENTS

2018/0217786 A1*　8/2018　Sakai ..................... G06F 3/1288
2020/0287848 A1　9/2020　Yuki
2024/0007542 A1*　1/2024　Otake ..................... H04L 67/51

FOREIGN PATENT DOCUMENTS

JP　　　2020-145647 A　　9/2020

* cited by examiner

*Primary Examiner* — Jacky X Zheng
(74) *Attorney, Agent, or Firm* — Oliff PLC

(57)　　　　ABSTRACT

A service providing system includes a first apparatus that stores first attribute data including status information on the first apparatus and setting information on a function of the first apparatus, updates the first attribute data to contents specified by a modification instruction if the modification instruction of the first attribute data is received from a user, and establishes synchronization via a first connection such that, in a second apparatus storing second attribute data corresponding to the first attribute data, contents of the second attribute data become identical to contents of the updated first attribute data; and the second apparatus that, if a modification instruction of the second attribute data is received from a user, updates the second attribute data to contents specified by the modification instruction of the second attribute data, and establishes synchronization via the first connection such that, in the first apparatus, contents of the first attribute data become identical to contents of the updated second attribute data, wherein if the contents of the first attribute data updated in response to the modification instruction received by the first apparatus are different, before the synchronization, from the contents of the second attribute data updated in response to the modification instruction received by the second apparatus, attribute data to be prioritized is identified by referring to priority information defining which attribute data, the first attribute data or the second attribute data, is to be prioritized, and the first apparatus and the second apparatus establish the synchronization via the first connection such that the first attribute data and the second attribute data are updated to contents of the attribute data to be prioritized.

11 Claims, 19 Drawing Sheets

| ATTRIBUTE | POSSIBLE VALUE | PRIORITY INFORMATION |
|---|---|---|
| TLS SETTING | DISABLED<br>✔ ENABLED | ✔ PRIORITIZED DS<br>PRIORITIZED RD<br>TIME STAMP<br>FIXED RD<br>FIXED DS |
| IP ADDRESS | ✔ DHCP<br>FIXED | PRIORITIZED DS |
| TIME SERVER | DISABLED<br>✔ ENABLED:<br>SERVER IP ADDRESS | PRIORITIZED DS |
| AUTHENTICATION MODE | DISABLED<br>✔ ON-BOARD AUTHENTICATION<br>EXTERNAL AUTHENTICATION | PRIORITIZED RD |
| NO COLOR COPYING | DISABLED<br>✔ ENABLED | PRIORITIZED RD |
| NICKNAME | ANY CHARACTER STRING | TIME STAMP |
| PRESENCE OF FINISHER | NO<br>✔ YES | FIXED RD |
| TONER/ REMAINING AMOUNT | ANY VALUE | FIXED RD |

FIG. 13

| UPDATE PRIORITY | PRIORITY LEVEL 1 [SET IN NEXT TERM] | PRIORITY LEVEL 2 [SET WHEN POWER IS ON OR OFF] | PRIORITY LEVEL 3 [SET ACCORDING TO SPECIFIED DATE AND TIME/ FREQUENCY OF OCCURRENCE] |
|---|---|---|---|
| ATTRIBUTE | × TLS SETTING<br>× IP ADDRESS<br>× CHANGING TIME SERVER<br>× TONER REMAINING AMOUNT<br>× PAPER REMAINING AMOUNT | × ADDING FINISHER<br>× ADDING IC CARD READER<br>× CHANGING PRINTER PORT<br>× MODIFYING SETTINGS OF MAIL NOTIFICATION<br>× ADDING NETWORK CARD | × JOB LOG (SPECIFIED DATE OF EACH MONTH)<br>× AUDIT LOG (EVERY AUDIT PERIOD)<br>× SYSTEM LOG (EVERY DS REQUEST)<br>× DNS SERVER ADDRESS (EACH TIME NETWORK ENVIRONMENT IS SWITCHED)<br>× MODIFYING AUTHENTICATION MODE (EACH TIME SETTING MODIFIED)<br>× APPLICATION VERSION (EVERY UPDATE) |

FIG. 18

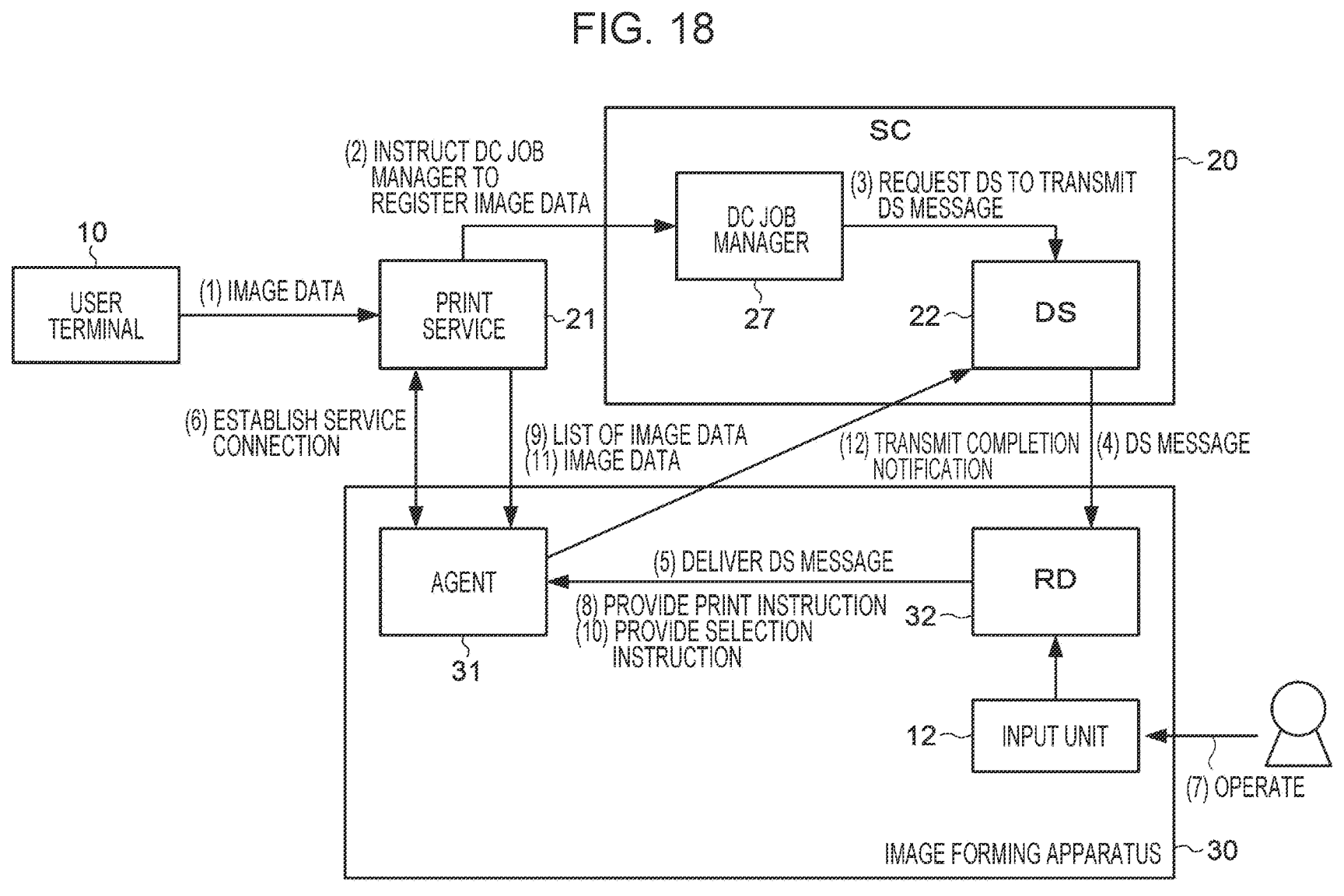

(7) OPERATE

20

SC

DC JOB MANAGER
27

(3) REQUEST DS TO TRANSMIT DS MESSAGE

DS
22

(4) DS MESSAGE

RD
32

INPUT UNIT
12

IMAGE FORMING APPARATUS
30

(2) INSTRUCT DC JOB MANAGER TO REGISTER IMAGE DATA

(12) TRANSMIT COMPLETION NOTIFICATION (5) DELIVER DS MESSAGE (8) PROVIDE PRINT INSTRUCTION
(10) PROVIDE SELECTION INSTRUCTION (9) LIST OF IMAGE DATA
(11) IMAGE DATA

PRINT SERVICE
21

AGENT
31

(1) IMAGE DATA (6) ESTABLISH SERVICE CONNECTION

USER TERMINAL
10

SERVICE PROVIDING SYSTEM WITH SYNCHRONIZATION OF ATTRIBUTE DATA

CROSS-REFERENCE TO RELATED APPLICATIONS

This application is based on and claims priority under 35 USC 119 from Japanese Patent Application No. 2022-107208 filed Jul. 1, 2022.

BACKGROUND

(i) Technical Field

The present disclosure relates to a service providing system.

(ii) Related Art

Japanese Unexamined Patent Application Publication No. 2020-145647 discloses a system including multiple client terminals and a reception service system that receives data from the client terminals. The reception service system includes a receiving unit that receives data from the client terminals, and a first transmitting unit that transmits a first transmission rule to a specific client terminal if the specific client terminal among the client terminals has transmitted data in excess of a specific amount of value per unit time. Each of the client terminals includes a second transmitting unit that transmits, to the receiving unit, data related to an event having occurred at the client terminal, and a storage unit that stores the first transmission rule transmitted by the first transmitting unit. The second transmitting unit does not transmit, to the receiving unit, at least part of the data related to the event having occurred at the client terminal such that an amount of data to be transmitted per unit time is equal to or lower than a specific value in accordance with the stored first transmission rule.

When different apparatuses individually storing the same attribute data individually receive updated attribute data, and if one of the apparatuses modifies the attribute data, synchronization of attribute data is established such that the attribute data of another apparatus becomes identical to the attribute data updated on the one apparatus.

However, if settings of different contents are made on the same attribute data on each apparatus, it may be unclear that modification contents received by which apparatus are to be prioritized and to be reflected on the attribute data on each apparatus.

SUMMARY

Aspects of non-limiting embodiments of the present disclosure relate to providing a service providing system that may determine, if apparatuses individually storing the same attribute data receive settings of different contents on the same attribute data at the same time, modification contents received by which apparatus that are to be used to update the attribute data stored on each apparatus.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a service providing system including a first apparatus that stores first attribute data including status information on the first apparatus and setting information on a function of the first apparatus, updates the first attribute data to contents specified by a modification instruction if the modification instruction of the first attribute data is received from a user, and establishes synchronization via a first connection such that, in a second apparatus storing second attribute data corresponding to the first attribute data, contents of the second attribute data become identical to contents of the updated first attribute data; and the second apparatus that, if a modification instruction of the second attribute data is received from a user, updates the second attribute data to contents specified by the modification instruction of the second attribute data, and establishes synchronization via the first connection such that, in the first apparatus, contents of the first attribute data become identical to contents of the updated second attribute data, wherein if the contents of the first attribute data updated in response to the modification instruction received by the first apparatus are different, before the synchronization, from the contents of the second attribute data updated in response to the modification instruction received by the second apparatus, attribute data to be prioritized is identified by referring to priority information defining which attribute data, the first attribute data or the second attribute data, is to be prioritized, and the first apparatus and the second apparatus establish the synchronization via the first connection such that the first attribute data and the second attribute data are updated to contents of the attribute data to be prioritized.

BRIEF DESCRIPTION OF THE DRAWINGS

Exemplary embodiment of the present disclosure will be described in detail based on the following figures, wherein:

FIG. 3 illustrates an example of a configuration example of a real device (RD);

FIG. 12 illustrates an example of a priority order table;

FIG. 13 illustrates an example of an update priority level;

FIG. 18 is a sequence chart illustrating an example of the flow of data performed when a print function is executed using a print service.

DETAILED DESCRIPTION

Figure 1:
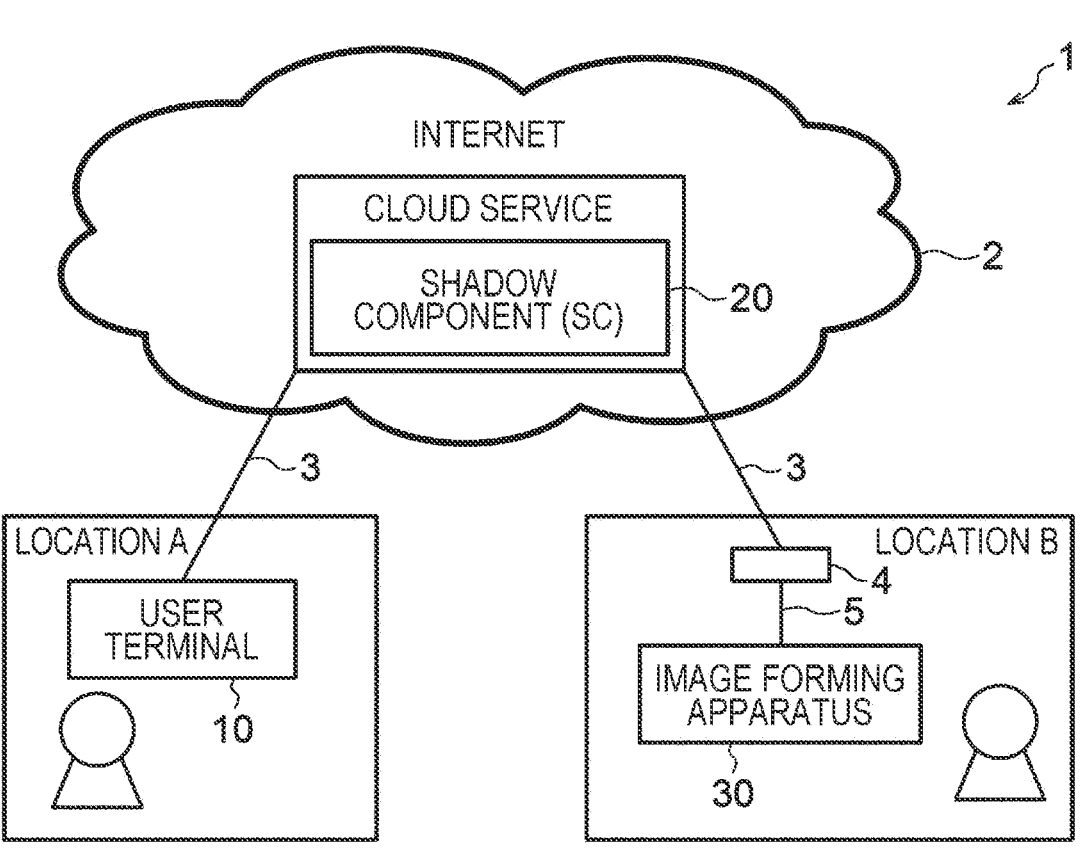
FIG. 1 illustrates an example of a system configuration of a service providing system.

Embodiment of the disclosure is described with reference to the drawings. Like elements and like operations are designated with like reference numerals throughout the drawings and the same explanation is not repeated.

FIG. 1 illustrates a system configuration of a service providing system 1 of the exemplary embodiment. Referring to FIG. 1, the service providing system 1 includes a user terminal 10, shadow component (SC) 20, and image forming apparatus 30, and provides service to users using the image forming apparatus 30.

The user terminal 10 is an information apparatus present at a location A and is operated by a user using the service providing system 1. Specifically, the user terminal 10 is, for example, a computer, smart phone, tablet terminal or wearable terminal and has a data input and output function, data processing function and communication function. The user terminal 10 may be a portable information apparatus that is used in a variety of locations or a fixed information apparatus that is used at a predetermined fixed location.

The image forming apparatus 30 serves as an example of a first apparatus of the exemplary embodiment of the disclosure and processes data related to images in response to an instruction from a user. The data processing of the images include, for example, a scan function that reads, as image data, contents recorded on a paper storage medium, such as a document, a copy function that reproduces, as an image on the paper medium, the contents of the image data of the document acquired through the scan function, and a print function that forms an image on the paper medium in accordance with the image data specified in advance by the user.

The image forming apparatus 30 stores attribute data related to a variety of functions of the image forming apparatus 30. The attribute data is a set of attributes representing contents of settings defining the status of the image forming apparatus 30 and the operation of the image forming apparatus 30, and the attribute is represented by a combination of an attribute item and a value. The attribute item is an identifier that identifies a value related to something about the image forming apparatus 30. For example, the attribute item is an Internet protocol (IP) address or a remaining amount of paper sheets accommodated in the image forming apparatus 30. Specifically, the "attribute" according to the exemplary embodiment of the disclosure represents one of combinations, each combination including an attribute item and a value.

The image forming apparatus 30 is installed at a remote place (a location B in FIG. 1, for example, an office) different from a location A (for example, a home) where a user operates the user terminal 10.

When a user at the location B (hereinafter referred to as a nearby user) uses service using the image forming apparatus 30, the nearby user may provide an instruction to the image forming apparatus 30 by touching and operating an operation panel on the image forming apparatus 30. When a user at the location A (hereinafter referred to as a "remote user") uses service using the image forming apparatus 30, it is unfeasible that the remote user moves to the location B to operate the image forming apparatus 30.

The shadow component 20 is arranged on the Internet 2 as an example of a network such that the remote user may use service using the image forming apparatus 30 from the location A. In the following discussion, the remote user and the nearby user are simply referred to as a user.

The shadow component 20 is a server that is constructed using cloud service available on the Internet 2. The shadow component 20 is connected to the user terminal 10 via a communication network 3 and to the image forming apparatus 30 via the communication network 3 and a firewall 4 accommodating a local-area network (LAN) 5 connected to the image forming apparatus 30.

The shadow component 20 includes metadata 24. The metadata 24 includes the attribute data on the image forming apparatus 30, including status information on the image forming apparatus 30, device configuration of the image forming apparatus 30, and a setting value defining the operation of the image forming apparatus 30. The metadata 24 is a data set containing the attribute data.

The shadow component 20 stores, as the metadata 24, attribute data identical to the attribute data on the image forming apparatus 30 installed at the location B.

The remote user provides an instruction from the user terminal 10 to the shadow component 20 and verifies a reply from the shadow component 20 in response to the instruction from the user terminal 10. The remote user may thus virtually operate the image forming apparatus 30 installed at the location B.

The attribute data is represented by a combination of an attribute item and a value. The attribute data including the status information on the image forming apparatus 30 and the setting information on the image forming apparatus 30 is an example of first attribute data. On the other hand, the metadata 24 managed by the shadow component 20 is an example of second attribute data and is data about synchronization established with the attribute data of the image forming apparatus 30 serving as the first attribute data.

No restrictions are imposed on a connection configuration of the communication network 3 and LAN 5 in the service providing system 1. The connection configuration may be a wired connection, a wireless connection, or a combination thereof. The communication network 3 may be an exclusive network or a virtual private network (VPN).

The firewall 4 is arranged such that an unauthorized access from the Internet 2 to the image forming apparatus 30 may be controlled. The firewall 4 thus receives only a reply responsive to a request from the image forming apparatus 30 and does not receive other data from the Internet 2.

Figure 2:
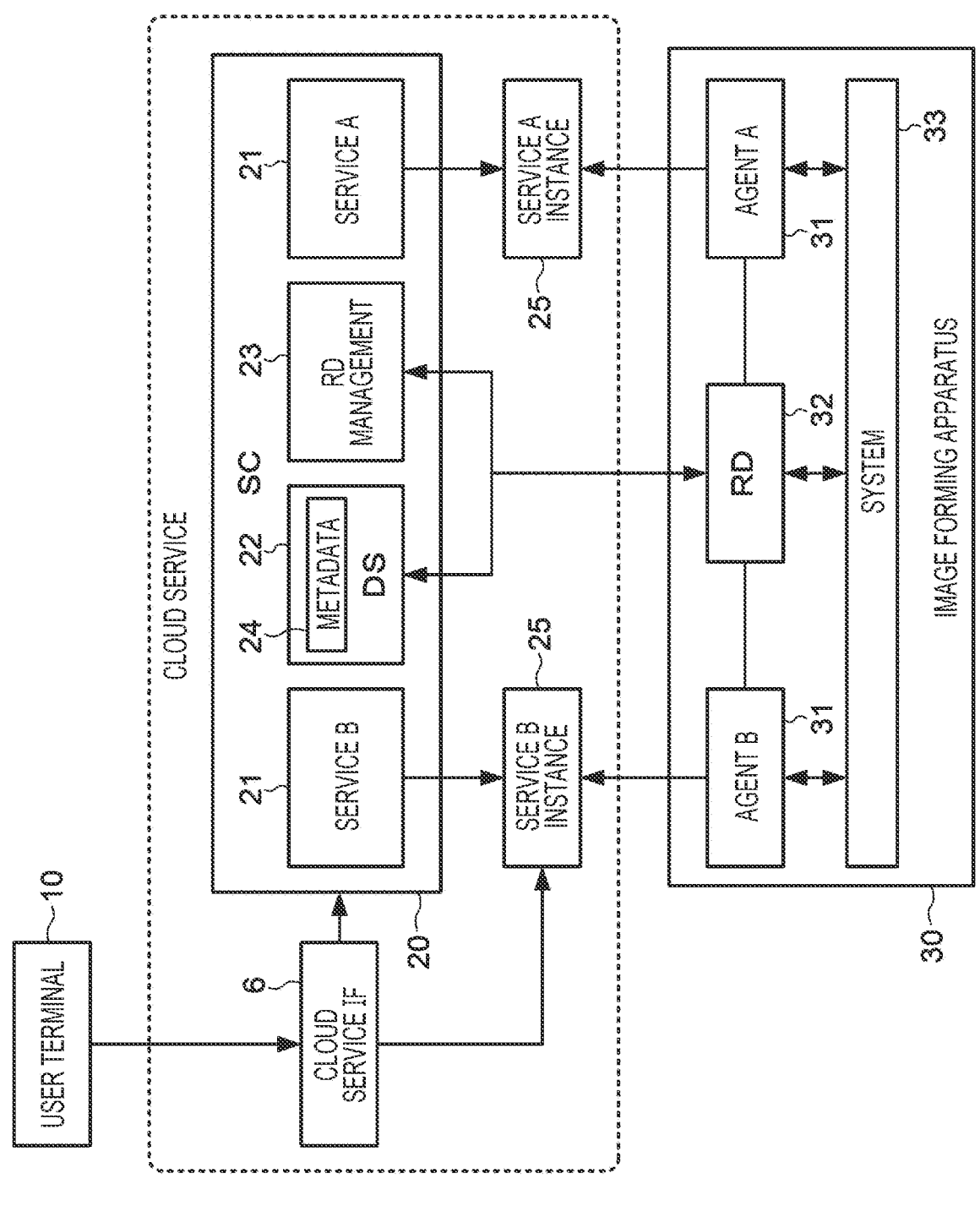
FIG. 2 illustrates an example of a functional configuration of a shadow component (SC) and an image forming apparatus.

FIG. 2 illustrates an example of a functional configuration of the shadow component 20 (hereinafter referred to as a SC20) implemented using cloud service and image forming apparatus 30. FIG. 2 also illustrates a cooperation operation performed between these functional blocks.

The cloud service includes a cloud service interface (IF) 6. The cloud service IF 6 receives first an instruction from the remote user transmitted via the user terminal 10, converts the received instruction in terms of an instruction form used in the shadow component 20, and then transmits the instruction in the instruction form to the shadow component 20. The cloud service IF 6 connects to a service instance 25 described later that supports service used by the remote user and transmits a process status and results of service to the user terminal 10. In other words, the cloud service IF 6 serves as an interface to connect the user terminal 10 to the SC20.

When the remote user uses a function available on the image forming apparatus 30, interface specifications of the SC20 may be kept secret by connecting the user terminal 10 to the cloud service IF 6 in place of directly connecting the user terminal 10 to the SC20. When a person related to a developer of the image forming apparatus 30 as the remote user uses the service providing system 1, the person may directly connect the user terminal 10 to the SC20 not by way of the cloud service IF 6.

The SC20 includes, for example, a service 21, digital shadow (DS) 22, read device (RD) management 23, and the DS 22 further includes the metadata 24.

The services 21 are components having design information defining the functions of the image forming apparatus 30. If the image forming apparatus 30 has multiple functions including the scan function, print function, and attribute setting function, the services 21 respectively responsive to the functions are used. In the following discussion where one service 21 is differentiated from another service 21, the services may be referred to as a service A and service B without reference numeral "21" attached thereto.

The DS 22 is a component that performs a process responsive to a request in cooperation with the service 21 and RD management 23.

The RD management 23 verifies the authenticity of a real device (RD) 32. The RD 32 serves as an interface of the image forming apparatus 30 with the DS 22 when the SC20 cooperates with the image forming apparatus 30 to provide, as the service 21, a function of the image forming apparatus 30 to a user having requested service. The RD management 23 determines whether the image forming apparatus 30 as a connection destination is a pre-registered regular image forming apparatus 30. If the image forming apparatus 30 as the connection destination is not an pre-registered regular image forming apparatus 30, the RD management 23 does not connect the SC20 to the image forming apparatus 30, thereby increasing the security level of the service providing system 1.

The metadata 24 managed by the DS 22 is a set of attribute items and values, serving as a synchronization target between the SC20 and the image forming apparatus 30. The synchronization of the attribute data refers to a process that is performed for the SC20 and image forming apparatus 30 to notify each other of the value of the attribute item such that the attribute item has the same value even when at least one of the SC20 and image forming apparatus 30 updates the value of the attribute item. Out of the attribute data on the image forming apparatus 30, the value of the attribute item specified as being a synchronization target (hereinafter referred to as a "synchronization target attribute item") is included in the metadata 24. The value of an attribute item refers to a value associated with the attribute item. The value of the attribute item includes a numerical value and a character string. The synchronization target attribute items may include attribute items of all attributes included in the attribute data or may include a predetermined attribute item. The synchronization target attribute item may include an attribute item with a value thereof that is modified during a specific period of time or may include a newly set attribute item.

The service instances 25 represent actual entities of the services 21, are respectively associated with the services 21, and are uploaded onto the cloud service. Specifically, each service instance 25 includes an interface receiving an instruction related to a function of the image forming apparatus 30 and performs a process complying with design information defined on the service 21.

Referring to FIG. 2, the service instance 25 representing a real entity of the service A is a service A instance 25, and the service instance 25 representing a real entity of the service B is a service B instance 25. The term "service instance 25" is a collective term that represents the real entity of the service 21 and is used when one instance is not differentiated from another and thus a specific term, such as the service A instance 25 or the service B instance 25 is not used. FIG. 2 illustrates the connection between the cloud service IF 6 and the service B instance but the cloud service IF 6 may also be connected to the service A instance 25 as appropriate.

The service instance 25 actually executes a function defined by a corresponding service 21. Since the service 21 and service instance 25 are closely related to each other, both the service 21 and service instance 25 may be collectively referred to as the "service 21" as long as there is no misunderstanding. The service 21 executing the function of the image forming apparatus 30 over the cloud service is an example of a service component.

The image forming apparatus 30 associated with the SC20 includes, for example, agents 31, RD 32, and system 33.

The agents 31 are components that provide the function of the image forming apparatus 30 to the outside and, specifically, provide the function to the user in cooperation with the service instance 25. The agents 31 are respectively associated with the service instances 25 according to type of function.

The service A instance 25 providing a function A defined by the service A is associated with an agent A providing the function A, and the service B instance 25 providing a function B defined by a service B is associated with an agent B. With the standpoint of the service instance the agent 31 may be recognized as a client that executes in cooperation with the service 21 an execution request of a function received by the service 21. The agent 31 is thus an example of a cooperation unit.

In the discussion herein, the service 21 has, in advance, agent identification information that uniquely identifies the agent 31 that performs the function associated with the service 21. The management method of the agent identification information is not limited to this method. For example, the service 21 may have only information indicating the type of the function performed by the service 21 and the DS 22 may associate the agent identification information with the information indicating the type of the function.

As described above, if the agent 31 is described on a per function basis, the terms "agent A" and "agent B" are used without attaching reference numeral "31" thereto.

As previously described, the RD 32 serves as an interface with the DS 22 when the SC20 provides the user with a function of the image forming apparatus 30 as the service 21 in cooperation with the image forming apparatus 30. Specifically, the RD 32 not only serves as an interface that performs a synchronization process of the attribute data with the SC20 but also assures the authenticity of the image forming apparatus 30. The RD 32 is connected to each of the DS 22 and RD management 23 in the SC20 and each of the agent 31 and system 33 in the image forming apparatus 30.

The system 33 manages all the attribute items of the image forming apparatus 30, references an attribute item to be managed, and thus controls, in cooperation with each of the agent 31 and the RD 32, the execution of the functions of the image forming apparatus 30.

Figure 3:
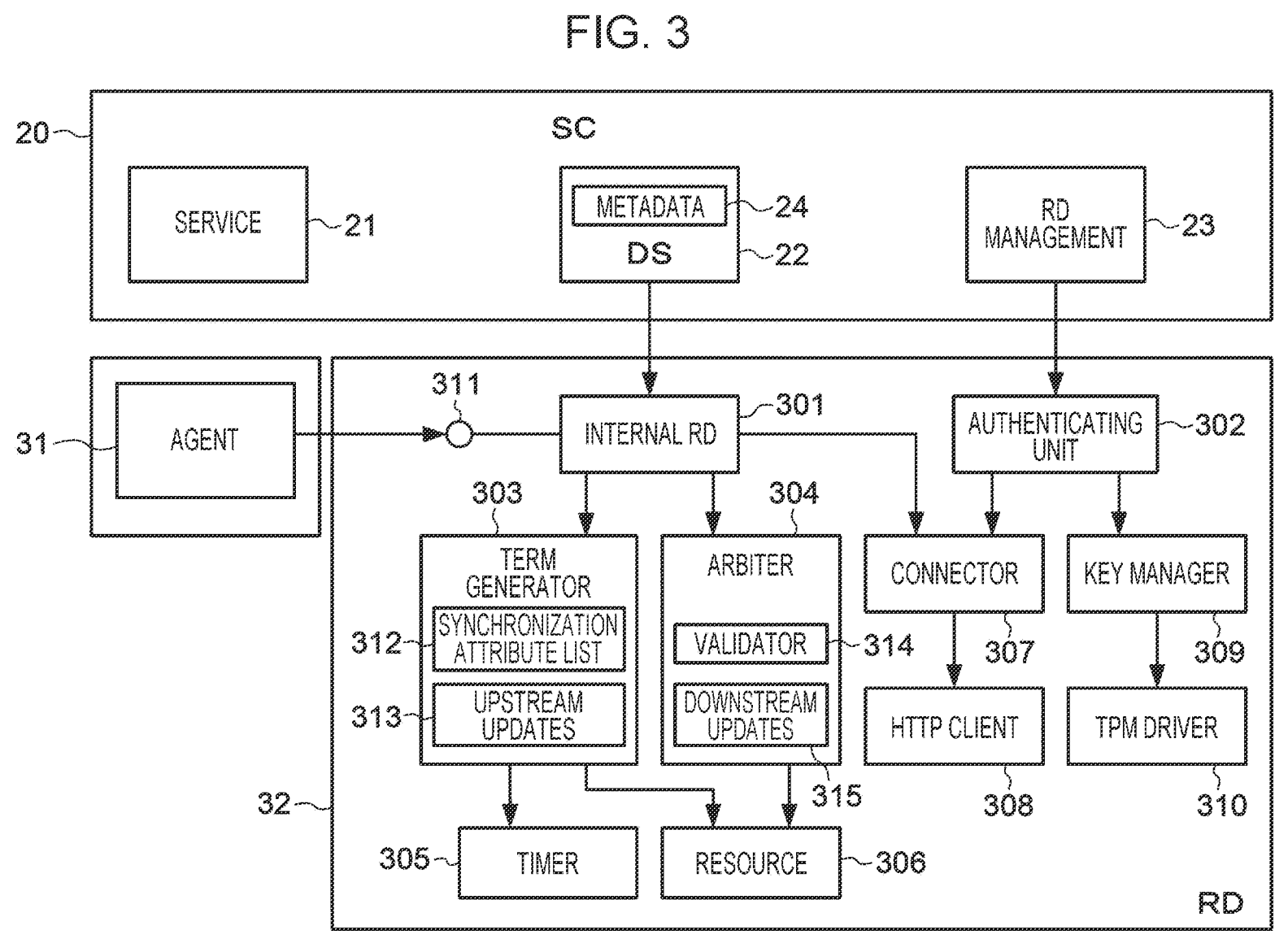

The configuration of the RD 32 is described below. FIG. 3 illustrates the configuration of the RD 32. The RD 32 includes an internal RD 301, authenticating unit 302, term generator 303, arbiter 304, timer 305, resource 306, connector 307, Hypertext Transfer Protocol (HTTP) client 308, key manager 309, trusted platform module (TPM) driver 310, and core service IF 311.

The internal RD 301 performs the synchronization process on the attribute data in cooperation with the term generator 303, arbiter 304, and connector 307.

The term generator 303 not only controls the start timing of the synchronization period of the attribute data with the SC20 and but also manages information related to each piece of the attribute data synchronized with the SC20 and information related to an attribute item that is updated when the nearby user operates the image forming apparatus 30.

The term generator 303 includes a synchronization attribute list 312 and upstream updates buffer 313.

The synchronization attribute list 312 defines a synchronization target attribute item out of attribute items of the image forming apparatus 30. Until the synchronization of the attribute data is established with the SC20, the upstream updates buffer 313 temporarily stores information related to the attribute item that is updated when the nearby user operates the image forming apparatus 30.

The timer 305 is connected to the term generator 303 and notifies the term generator 303 of timeout each time a predetermined period of time elapses. The notification of the timeout from the timer 305 triggers the term generator 303 to start the synchronization of the attribute data. The term generator 303 is connected to the resource 306 that associates each of the attribute items of the image forming apparatus 30 with a current value of the attribute item. The resource 306 updates the value of an attribute item in response to a modification instruction of the attribute item.

The arbiter 304 determines whether the value of the attribute item responsive to the modification instruction complies with a predetermined rule. To perform this determination, the arbiter 304 includes a validator 314 and downstream updates buffer 315.

The validator 314 validates appropriateness of a value to determine whether the value of the attribute item responsive to the modification instruction falls within a predetermined regular range.

The downstream updates buffer 315 temporarily stores information related to an updated attribute item until the synchronization of the attribute data is established with the SC20.

The arbiter 304 is connected to the resource 306 and accesses the resource 306 to update the value of the attribute item in response to the modification instruction.

The internal RD 301 is connected to the connector 307 to establish the synchronization of the attribute data with the SC20. The connector 307 encodes data transmitted from the image forming apparatus 30 to the SC20 (for example, notification data that is used to notify the DS 22 of the start of the synchronization period) in JavaScript Object Notation (JSON) format, and transmits the encoded data as a Hypertext Transfer Protocol (HTTP) request to the DS 22 via the HTTP client 308.

The HTTP client 308 in turn receives data that is transmitted by the DS 22 in response to the HTTP request to the DS 22 and transfers the received data to the internal RD 301.

Using the authenticating unit 302, the RD 32 manages whether the SC20 serving as a destination is a regular SC20.

The authenticating unit 302 is connected to the key manager 309 and connector 307, causes the key manager 309 to generate a key pair, holds the generated key pair on the TPM driver 310, and transmits one key of the generated pair to the RD management 23 via the connector 307. If the key received from the image forming apparatus 30 matches a pre-registered key, the RD management 23 determines that the image forming apparatus 30 as the connection destination is a regular image forming apparatus 30 and transmits a token to the authenticating unit 302.

Each piece of data exchanged between the SC20 and image forming apparatus 30 is attached with a token that the RD management 23 has notified to the authenticating unit 302. The token attached to the data allows the SC20 and the image forming apparatus 30 to mutually determine whether the sender of data is a regular partner that has been authenticated.

Each agent 31 and RD 32 are interconnected to each other via the core service IF 311.

The SC20 and image forming apparatus 30 may respectively include a computer 40 and a computer 50.

Figure 4:
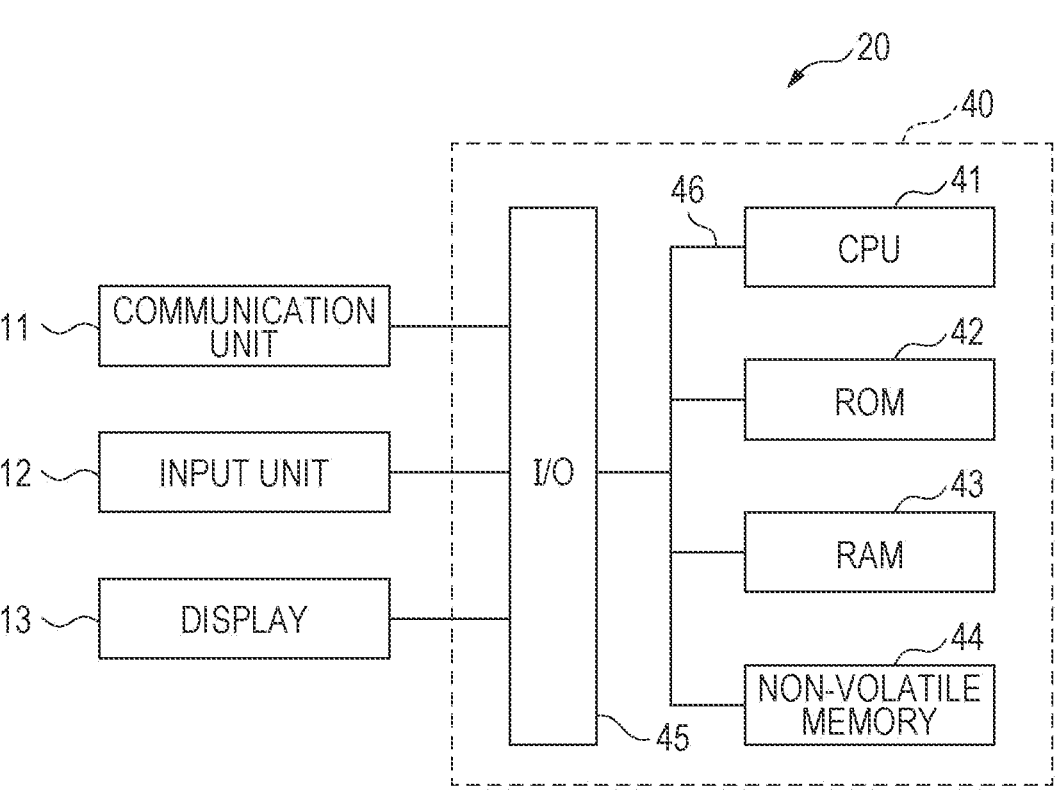
FIG. 4 illustrates an example of an electrical configuration of a computer forming the SC.

FIG. 4 illustrates a configuration example of the computer 40 forming the SC20.

The computer 40 serving as an example of a second apparatus includes a central processing unit (CPU) 41 serving as an example of a processor and performing the operation of each component of the SC20 in FIG. 2, read-only memory (ROM) 42 storing basic input-output system (BIOS) performing a startup operation of the computer 40, random-access memory (RAM) 43 used as a temporary work area of the CPU 41, non-volatile memory 44, and input-output interface (I/O) 45. The CPU 41, ROM 42, RAM 43, non-volatile memory 44, and I/O 45 are interconnected to each other via a bus 46.

The non-volatile memory 44 is an example of a memory that continues to store information even when power to the non-volatile memory 44 is interrupted. The non-volatile memory 44 is typically a semiconductor memory. Alternatively, the non-volatile memory 44 may be a hard disk. For example, data, such as the metadata 24, which is to be continuously stored even when power to the computer 40 is interrupted, is stored on the non-volatile memory 44. The non-volatile memory 44 thus stores an information processing program that causes the computer 40 to function as the SC20.

The I/O 45 is connected to, for example, the communication unit 11, input unit 12, and display 13.

The communication unit 11 is connected to the communication network 3 and supports a communication protocol that performs data communication with the user terminal 10 and image forming apparatus 30.

The input unit 12 receives an operation of an administrator managing the cloud service and notifies the CPU 41 of the operation. For example, the input unit 12 includes buttons, touch panel, keyboard, mouse and pointing device.

The display 13 is an example of a unit that visually displays information processed by the CPU 41. For example, the display 13 includes a liquid-crystal display or an organic electroluminescence (EL) display.

Figure 5:
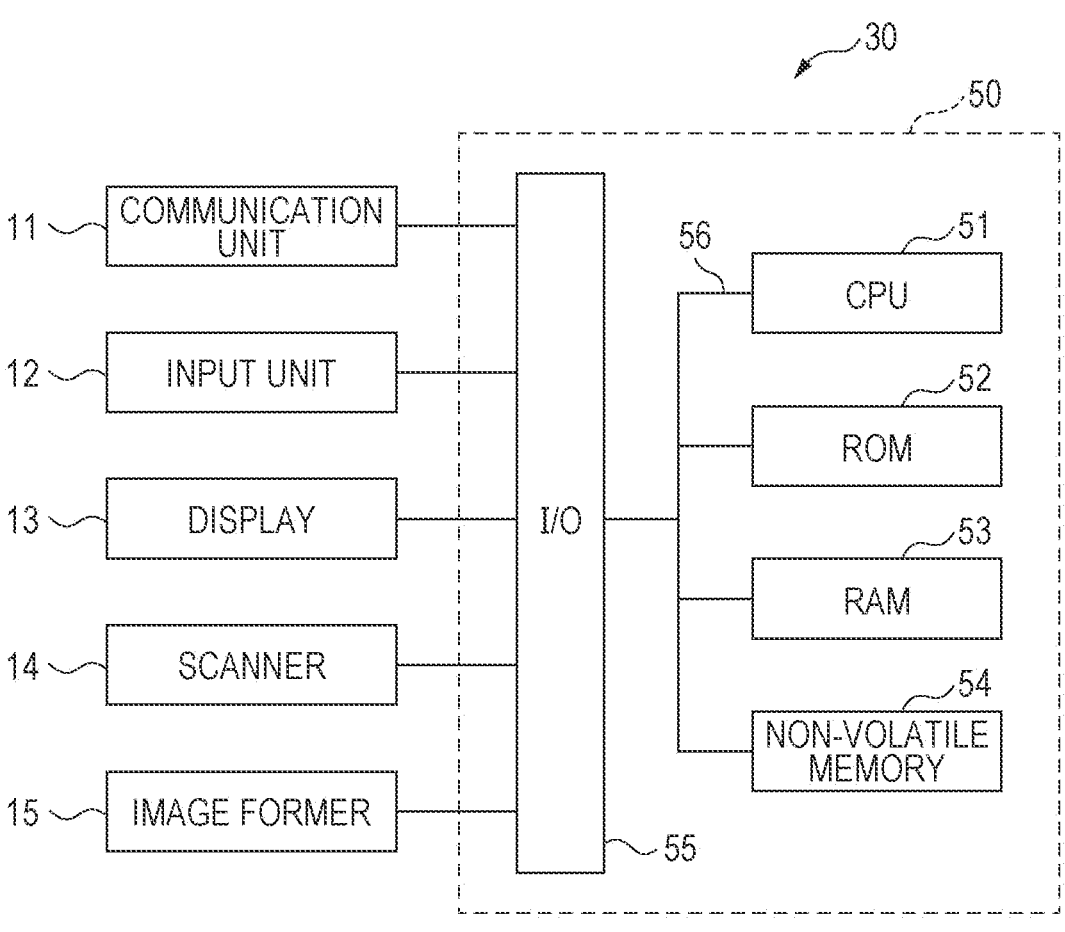
FIG. 5 illustrates an example of an electrical configuration of an image forming apparatus.

FIG. 5 illustrates an electrical configuration of the image forming apparatus 30 including the computer 50.

The computer 50 includes a CPU 51 that is an example of a processor performing a process of each component of the image forming apparatus 30 in FIG. 2 and controlling the system 33, ROM 52 that stores the BIOS performing the startup operation of the computer 50, RAM 53 used as a temporary work area of the CPU 51, non-volatile memory 54, and I/O 55. The CPU 51, ROM 52, RAM 53, non-volatile memory 54, and I/O 55 are interconnected to each other via a bus 56.

The non-volatile memory 54 stores data that is to be continuously stored even when power to the image forming apparatus 30 is interrupted. For example, the data includes the image forming program that causes the resource 306 and computer 50 to function as the image forming apparatus 30.

The I/O 55 is connected to the communication unit 11, input unit 12, display 13, scanner 14, and image former 15.

The scanner 14 reads contents of a document transported onto transportation document reading glass (not illustrated) using an optical reading unit (not illustrated) and converts the contents of the document into image data.

The image former 15 forms an image, represented by image data, onto a paper medium, using a coloring material. The type of image forming method of the image former 15 is not limited to any particular type. The image former 15 may be of an electrophotographic system or an ink-jet system.

Units connected to the computer 40 and computer 50 are not limited to the units illustrated in FIGS. 4 and 5. Any adequate unit may be selectively connected to the computer 40 and computer 50.

Figure 6:
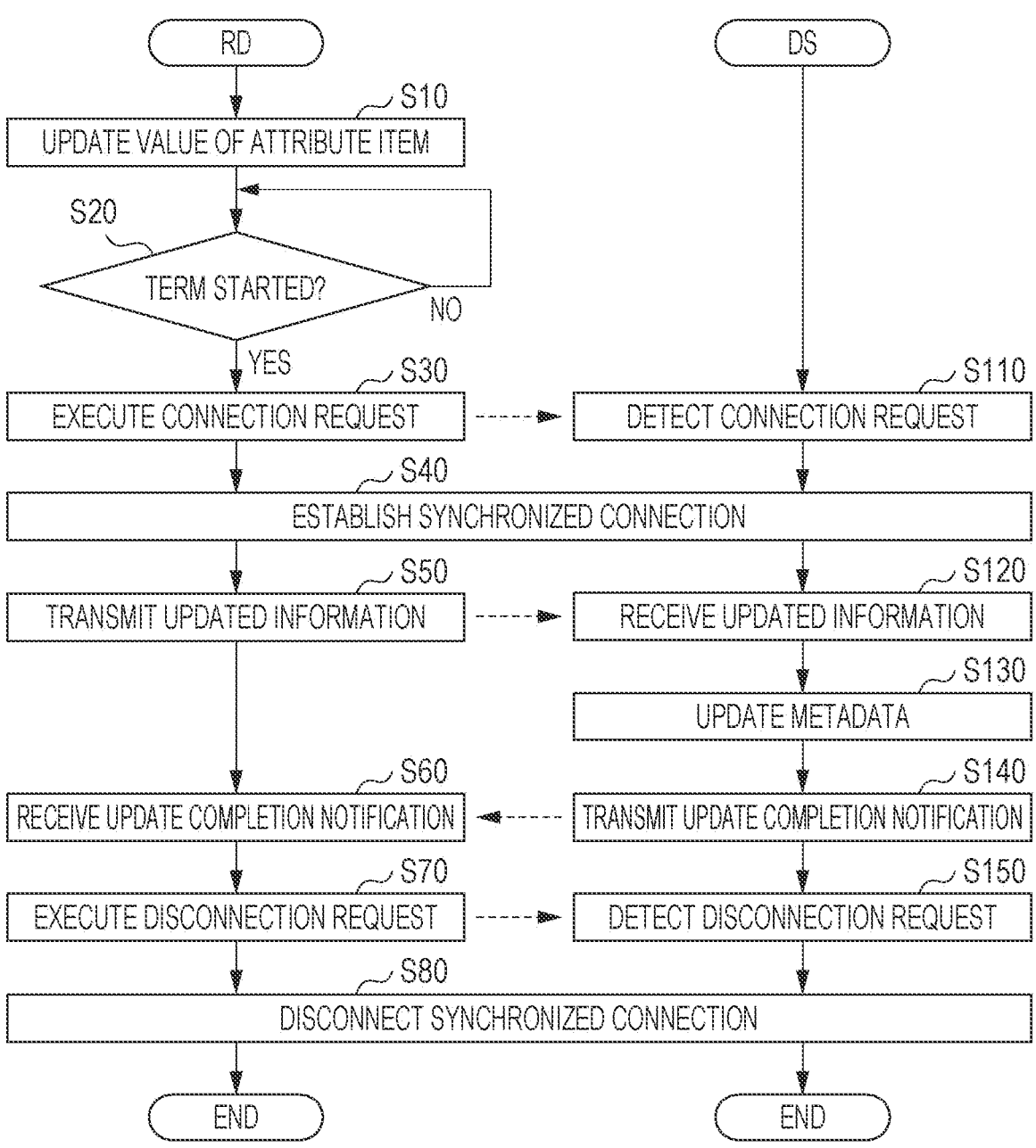
FIG. 6 illustrates an example of a flow of a synchronization process performed by a central processing unit (CPU) of the image forming apparatus and a CPU of the computer forming the SC when a nearby user updates a value of an attribute.

The synchronization process of the attribute data in the service providing system 1 is described below. FIG. 6 is a flow chart illustrating an example of the flow of the synchronization process that is performed by the CPU 51 in the image forming apparatus 30 and the CPU 41 in the computer 40 forming the SC20. The synchronization process is performed when the nearby user provides, using the input unit 12 in the image forming apparatus 30, a modification instruction to update the value of the synchronization target attribute item.

The image forming program of the image forming apparatus 30 defining the synchronization process is pre-stored, for example, on the non-volatile memory 54 in the image forming apparatus 30. The CPU 51 in the image forming apparatus 30 reads the image forming program from the non-volatile memory 54 and performs the synchronization process. The image forming program is an example of an apparatus program that executes the functions of the image forming apparatus 30.

A server program of the computer 40 defining the synchronization process is pre-stored, for example, on the non-volatile memory 44 in the computer 40. The CPU 41 in the computer 40 reads the server program from the non-volatile memory 44 and performs the synchronization process.

It is noted that the SC20 assures the authenticity of the RD 32 before the synchronization process.

Figure 7:
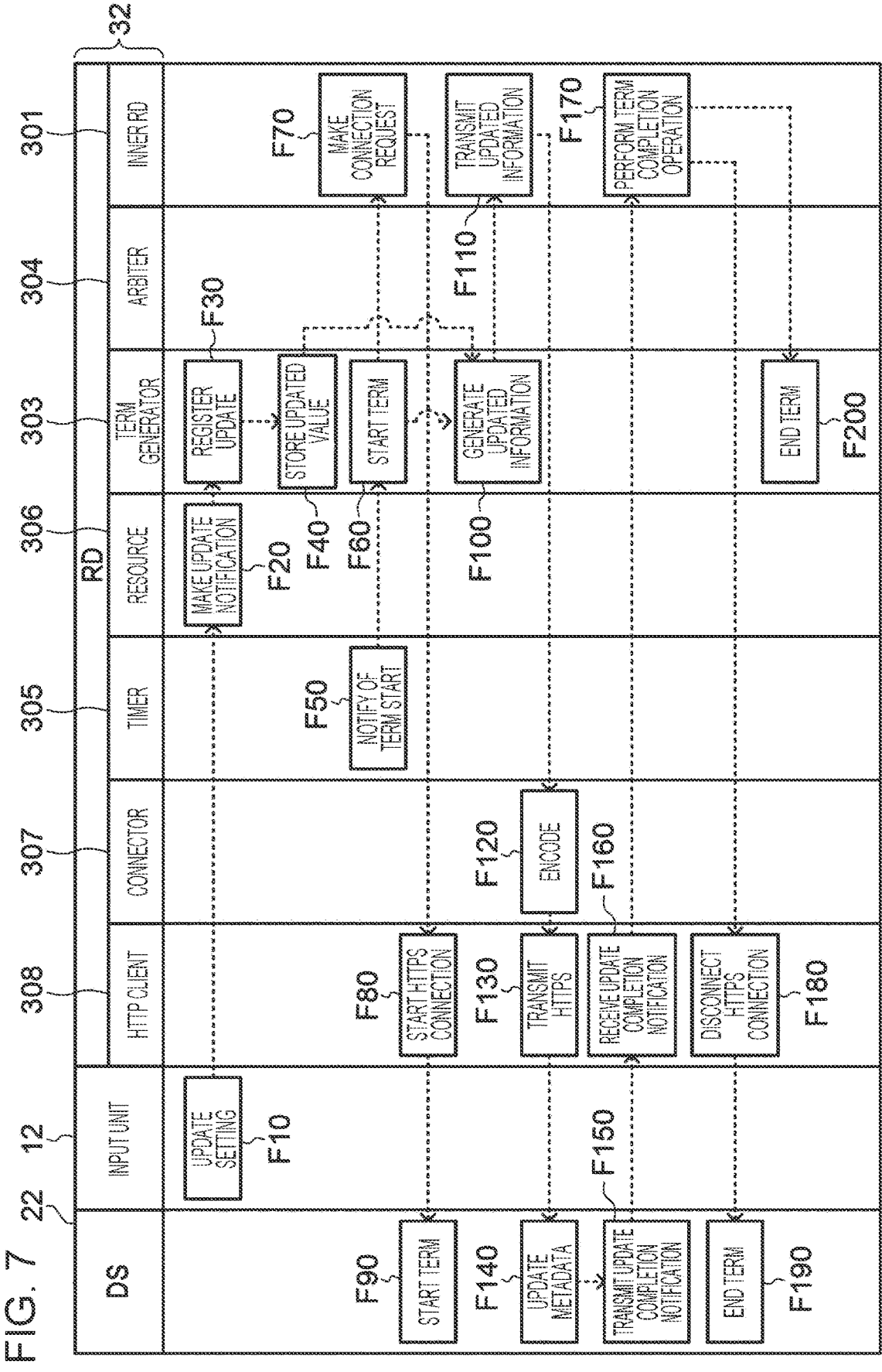
FIG. 7 illustrates a sequence chart illustrating an example of the flow of data within the RD performed when the nearby user updates a value of an attribute.

For convenience of explanation, the flow of the synchronization process in FIG. 6 is described also with reference to FIG. 7. FIG. 7 is a sequence chart illustrating an example of the flow of data in the RD 32 illustrated in FIG. 3 when the synchronization process in FIG. 6 is performed. The input unit 12 in FIG. 7 represents the input unit 12 in the image forming apparatus 30.

When the nearby user sets the value of the synchronization target attribute item to a new value by operating the input unit 12 in the image forming apparatus 30 (F10 in FIG. 7), the resource 306 updates the attribute item serving as the value modification target to the new value in step S10.

When the value of the attribute item is updated, the resource 306 transmits an update notification to the term generator 303, notifying the term generator 303 that the value the attribute item has been updated (F20 in FIG. 7).

When the update notification is received, the term generator 303 registers updating performed in the term generator 303 (F30 in FIG. 7), associates update identification information uniquely identifying the updated attribute item with the new value after updating, namely, associates the setting value with a time stamp, and then stores the setting value and time stamp in association on the upstream updates buffer 313 (F40 in FIG. 7).

The time stamp is an example of time information representing time when the modification instruction of the value of the attribute item is received from the input unit 12. The time stamp is associated with each updated attribute item.

In step S20 in FIG. 6, the term generator 303 determines whether a term has been started. The word "term" represents a synchronization period of the attribute data between the SC20 and image forming apparatus 30 and a timeout notification from the timer 305 that times out every predetermined time interval triggers the term generator 303 to start the term. When the timeout notification is not received from the timer 305, the term generator 303 determines that a next term has not been started yet and thus monitors the timeout notification by repeating the operation in step S20. On the other hand, when the timeout notification is received from the timer 305 (F50 in FIG. 7), the term generator 303 determines that the term has started (F60 in FIG. 7) and proceeds to step S30.

When the term is started, the internal RD 301 makes a connection request to the DS 22 in step S30 in order to connect the RD 32 to the DS 22 (F70 in FIG. 7). Specifically, the HTTP client 308 is notified of the connection request from the internal RD 301 and starts a Hypertext Transfer Protocol Secure (HTTPS) connection (F80 in FIG. 7).

In step S110, the DS 22 detects the connection request from the RD 32.

In response to the detected connection request, in step S40 in FIG. 6, the HTTP client 308 and DS 22 establishes link by a predetermined connection sequence. The term "link" refers to a channel established in the communication network 3. The link connecting the DS 22 and RD 32 is hereinafter referred to as a "synchronized connection."

The DS 22 recognizes that the synchronized connection has been established and thus the term has started (F90 in FIG. 7).

After the term starts, the term generator 303 generates updated information by referencing information stored on the upstream updates buffer 313 (F100 in FIG. 7).

The updated information is an example of the attribute data, containing a value at the start of the term of each attribute item that is updated after the start of a previous term, out of the synchronization target attribute items. It is noted that the term generator 303 associates each attribute item having an updated value with a time stamp stored on the upstream updates buffer 313. In order to manage the value of the attribute item updated in the term, the term generator 303 attaches, to the updated information, term identification information uniquely identifying each term and transmission start time of the updated information.

In step S50 in FIG. 6, the internal RD 301 transmits the generated updated information to the DS 22 (F110 in FIG. 7). In this case, the updated information is encoded by the connector 307 (F120 in FIG. 7), and the HTTP client 308 performs HTTPS transmission (F130 in FIG. 7).

In step S120 in FIG. 6, the DS 22 receives the updated information from the RD 32.

In step S130, the DS 22 updates a value of the metadata 24 corresponding to the attribute item, which is notified as being updated by the updated information received in step S120, out of the attribute items contained in the metadata 24 (F140 in FIG. 7). In this way, the SC20 and image forming apparatus 30 are set to have the same value in each of the synchronization target attribute items and an image forming apparatus 30 that reflects the attribute data of the image forming apparatus 30 at the start of the term is formed on the cloud service.

The synchronization of the attribute data thus ends and in step S140, the DS 22 transmits to the RD 32 an update completion notification indicating that the attribute data has been synchronized (F150 in FIG. 7).

In step S60 in FIG. 6, the HTTP client 308 receives the update completion notification (F160 in FIG. 7) and notifies of the internal RD 301 that the update completion notification has been received from the DS 22.

In response to the reception of the update completion notification, the internal RD 301 deletes information related to the attribute item updated and stored on the upstream updates buffer 313.

Now that the attribute data has been synchronized, the internal RD 301 performs a term completion operation in step S70 (F170 in FIG. 7). Specifically, the internal RD 301 makes a disconnection request of the synchronized connection, the HTTP client 308 is notified of the disconnection request of the internal RD 301, and the HTTP client 308 starts HTTPS disconnection (F180 in FIG. 7).

In step S150 in FIG. 6, the DS 22 detects the disconnection request from the RD 32.

In response to the detection of the disconnection request, the HTTP client 308 and DS 22 disconnect the synchronized connection by performing a predetermined disconnection sequence in step S80 in FIG. 6. The internal RD 301 and DS 22 recognize that the term has ended in response to the disconnection of the synchronized connection (F190 and F200 in FIG. 7). The synchronization process in the one term in FIG. 6 is thus complete.

When the value of at least one attribute item is updated in a term, the RD 32 does not synchronize the attribute data including the updated attribute item in the current term but synchronizes the attribute data, containing the attribute item updated in the current term, during the next term.

If the synchronization of the attribute data fails because the synchronized connection is not established in step S40 in FIG. 6 due to a communication failure or other causes, the RD 32 ends the synchronization process without re-establishing the synchronized connection by making the connection request again during the same term. Information on the attribute item that is not synchronized remains without being deleted on the upstream updates buffer 313.

The RD 32 transmits to the DS 22 the updated information on all the attribute items remaining not synchronized but stored on the upstream updates buffer 313 in a first term during which the synchronized connection is established next. The synchronization of the attribute data is thus established between the DS 22 and RD 32.

The synchronization process performed when the value of the synchronization target attribute item is updated by the SC20 is described below.

Figure 8:
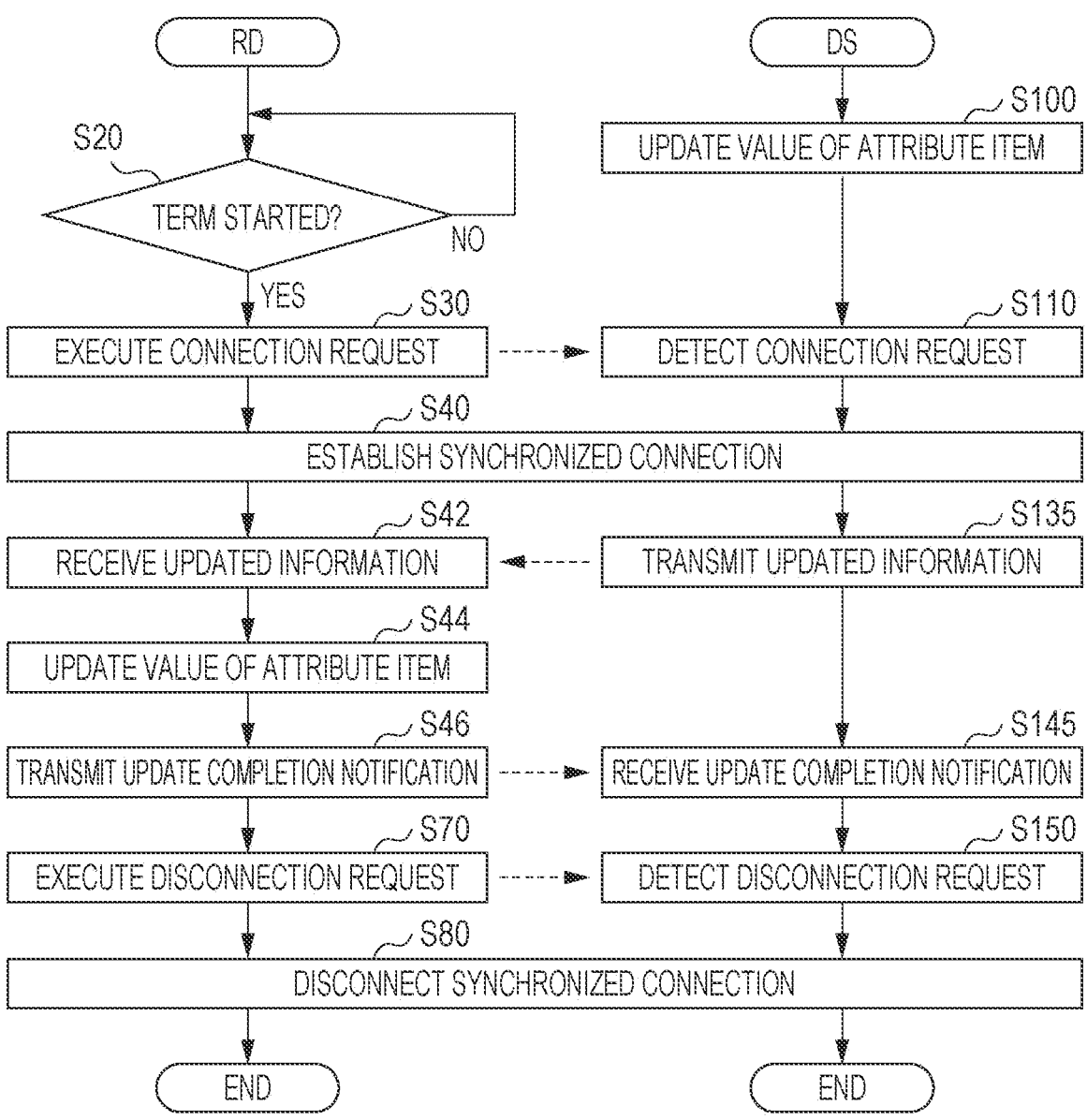
FIG. 8 is a flowchart illustrating an example of a flow of a synchronization process performed by the CPU of the image forming apparatus and the CPU of the computer forming the SC when a remote user updates the value of the attribute.

FIG. 8 is a flowchart illustrating an example of the flow of the synchronization process performed by the CPU 51 in the image forming apparatus 30 and the CPU 41 in the computer 40 when the remote user provides a modification instruction from the user terminal 10 to the SC20 in order to update the value of the synchronization target attribute item.

In the synchronization process in FIG. 8 that is different from the synchronization process in FIG. 6, step S10 is deleted from the process of the RD 32, step S100 is added to the process of the DS 22, steps S42, S44, and S46 are substituted for steps S50 and S60, and steps S135 through S145 are substituted for steps S120 through S140.

The flow of data within the RD 32 in the synchronization process with the value of the synchronization target attribute item updated on the SC20 may be understandable by referencing the sequence chart in FIG. 7.

When the remote user operates the user terminal 10 and provides the modification instruction to set the value of the synchronization target attribute item to a new value, the DS 22 updates an attribute item serving as a value modification target to a new value in step S100.

When a term starts on the RD 32 afterwards, the synchronized connection is established between the DS 22 and RD 32. In step S135, the DS 22 transmits to the RD 32 the updated information of the attribute item updated before the start of the term. The DS 22 attaches a time stamp to each attribute item updated while also attaching, to the updated information, the term identification information and the transmission start time of the updated information.

In step S42, the RD 32 receives the updated information from the DS 22.

In step S44, the RD 32 updates, to the value specified in the updated information, the value of the attribute item that is notified as being updated by the updated information received in step S42. In this way, the value of the attribute item updated by the SC20 is reflected on the attribute data of the image forming apparatus 30.

Since the synchronization of the attribute data is thus complete, the RD 32 transmits an update completion notification to the DS 22 in step S46.

In step S145, the DS 22 receives the update completion notification and recognizes that the synchronization of the attribute data is complete on the RD 32.

As described with reference to the synchronization process in FIG. 6, the RD 32 makes the disconnection request for the synchronized connection, disconnecting the synchronized connection, ending the one term, and thus completing the synchronization process in FIG. 8.

Even when the DS 22 receives the modification instruction from the user terminal 10 within the term, in the same way as in the process of the RD 32, the attribute data containing the attribute item updated in response to the modification instruction is not synchronized within the term currently in progress but the attribute data containing the attribute item updated in response to the modification instruction is synchronized within the next term.

If the synchronization of the attribute data fails because the synchronized connection is not established in step S40 in FIG. 8 due to a communication failure or other causes, the DS 22 synchronizes the attribute data during the next term. The DS 22 continuously holds the information on the attribute item not synchronized after updating and delete the information on the attribute item after the update completion notification is received in step S145.

The synchronization process performed when the value of the synchronization target attribute item is updated in both the SC20 and image forming apparatus 30 is described below.

The remote user and nearby user may individually update the value of the attribute item and different values may thus be set at the same attribute item. Contents of the modification instructions of the value of the attribute item respectively received by the SC20 and image forming apparatus 30 with respect to the same attribute item may be different and processing performed in response to the modification instructions may lead to an inconsistent situation. This is referred to as a "conflict."

Figure 9:
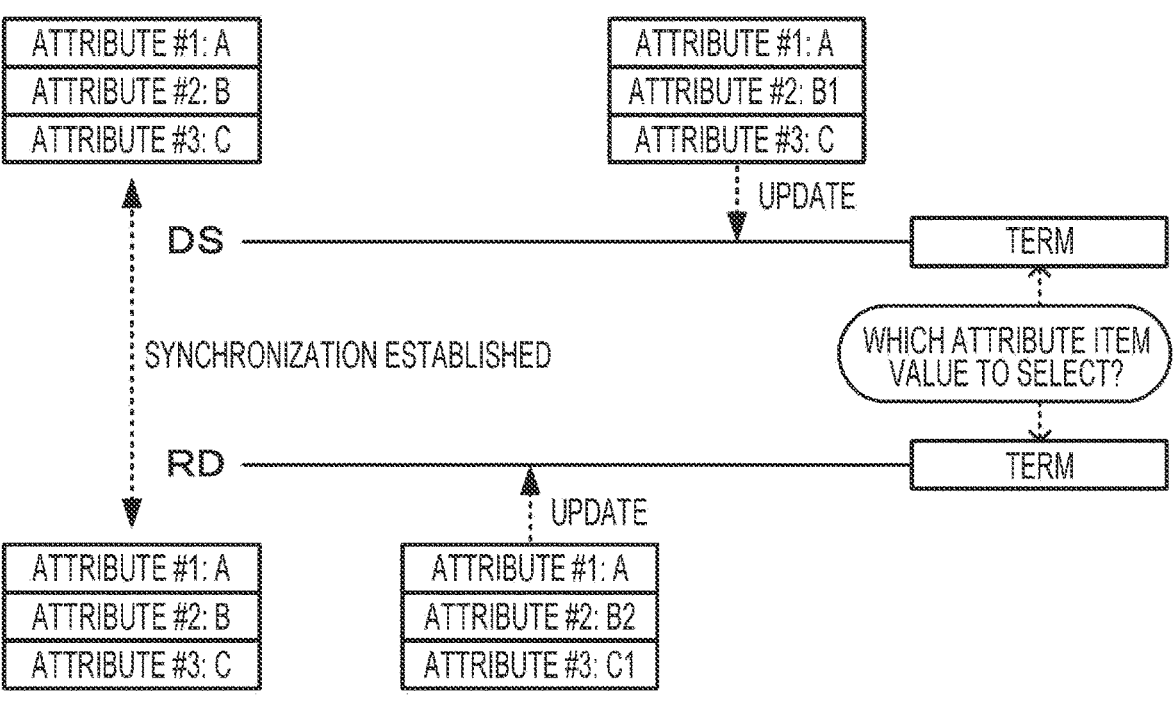
FIG. 9 illustrates an example of occurrence of a conflict.

FIG. 9 illustrates an example of conflict. For example, three synchronization target attribute items, namely, attribute #1, attribute #2, and attribute #3 are synchronized with values "A," "B," and "C." In this situation, after the RD 32 updates the value of the attribute #2 to "B2" and the value of the attribute #3 to "C1" before the start of the term, the DS 22 may update the value of the attribute #2 to "B1." This may lead to a problem of selecting the value updated by the DS 22 or the value updated by the RD 32 as the value of the attribute #2. The synchronization process performed when the conflict occurs is described below.

Figure 10:
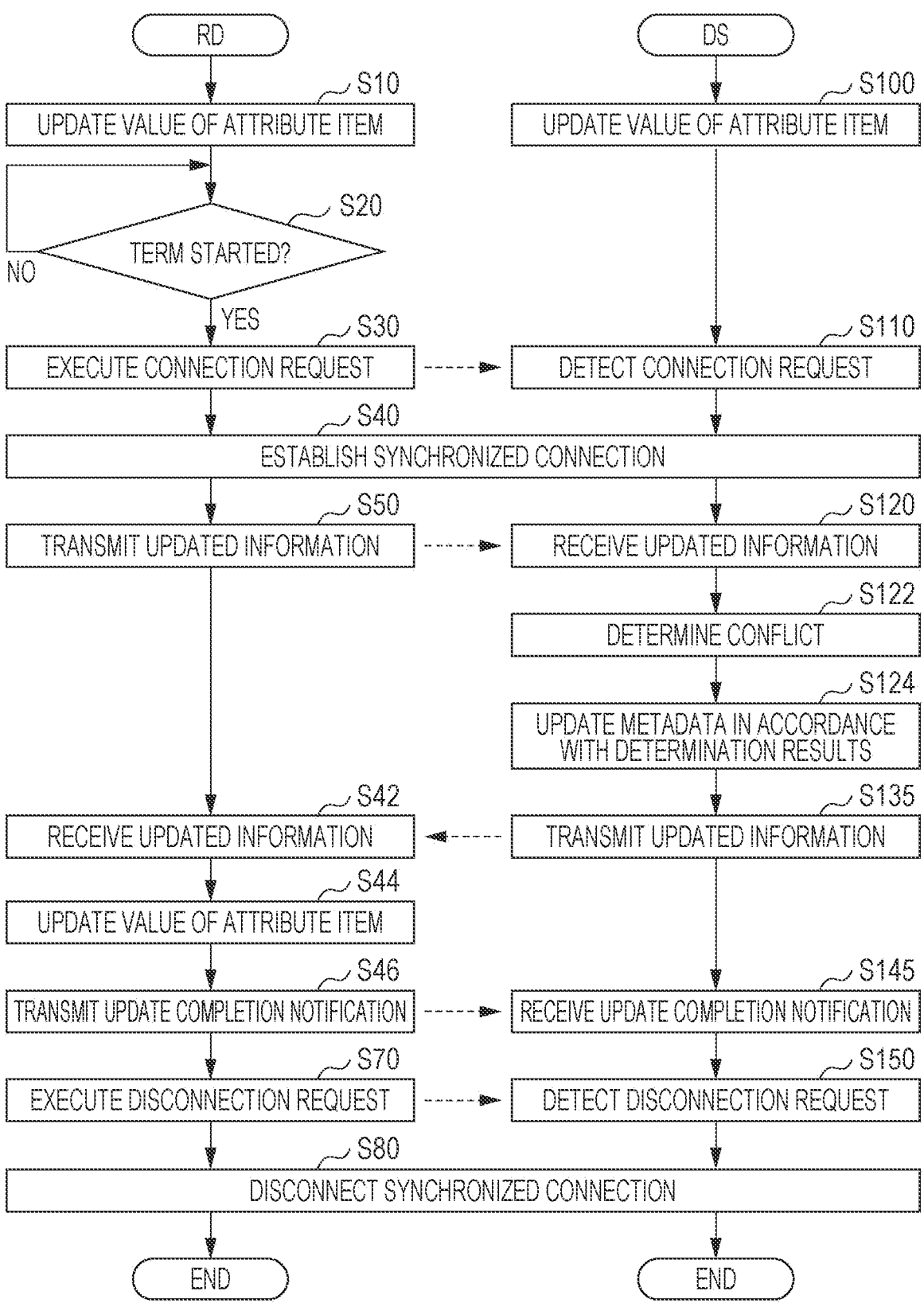
FIG. 10 is a flowchart illustrating an example of the flow of the synchronization process performed by the CPU of the image forming apparatus and the CPU of the computer forming the SC when the conflict occurs.

FIG. 10 is a flowchart illustrating an example of the flow of the synchronization process that is performed by the CPU 51 in the image forming apparatus 30 and the CPU 41 in the computer 40 forming the SC20 when a conflict occurs.

In the synchronization process in FIG. 10 that is different from the synchronization process in FIG. 8, steps S10 and S50 are added to the process of the RD 32 and steps S120, S122, and S124 are added to the process of the RD 32.

Figure 11A:
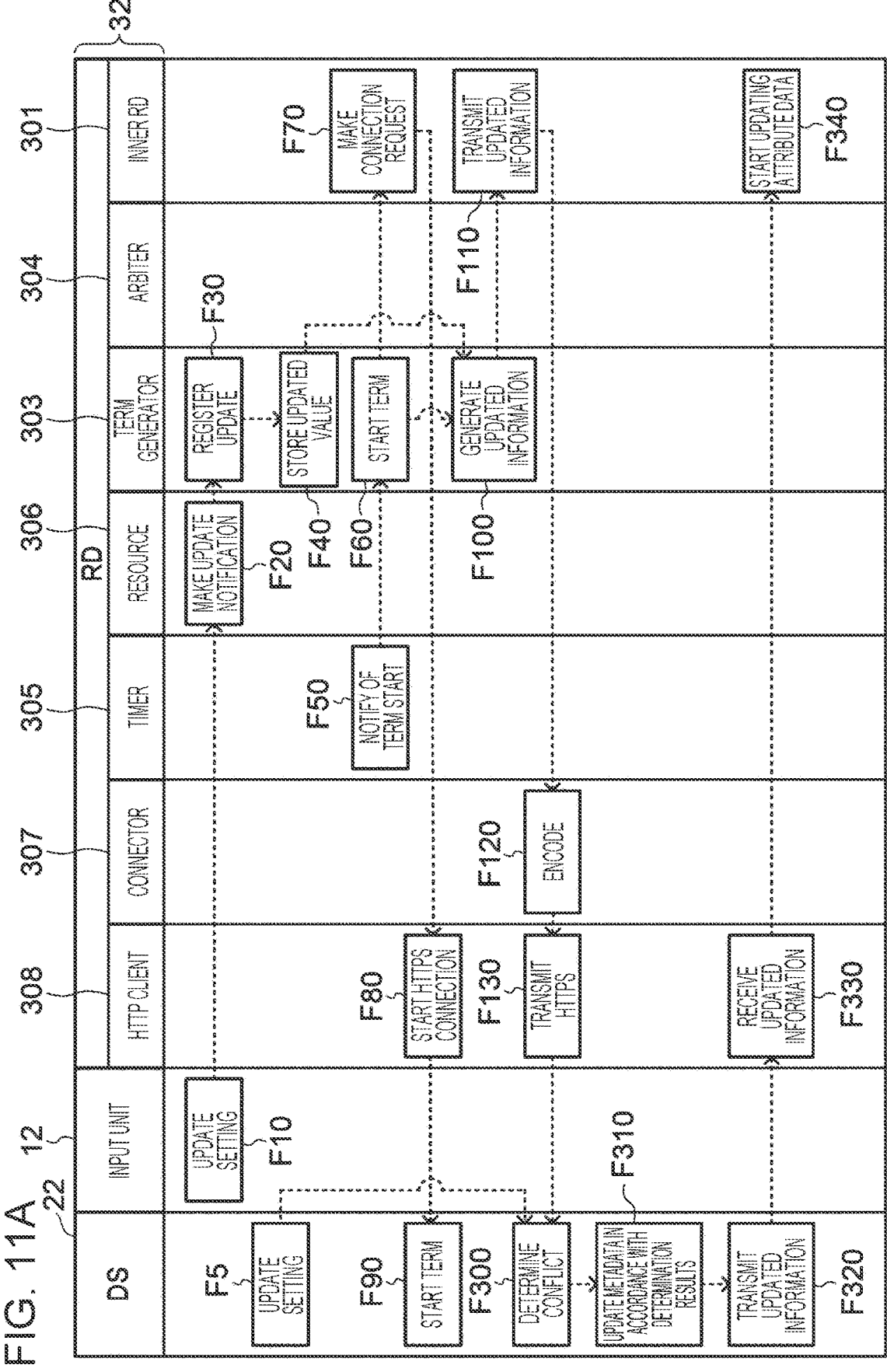
FIG. 11A is a sequence chart illustrating an example of a first half portion of the flow of data within the RD when the conflict occurs.
Figure 11B:
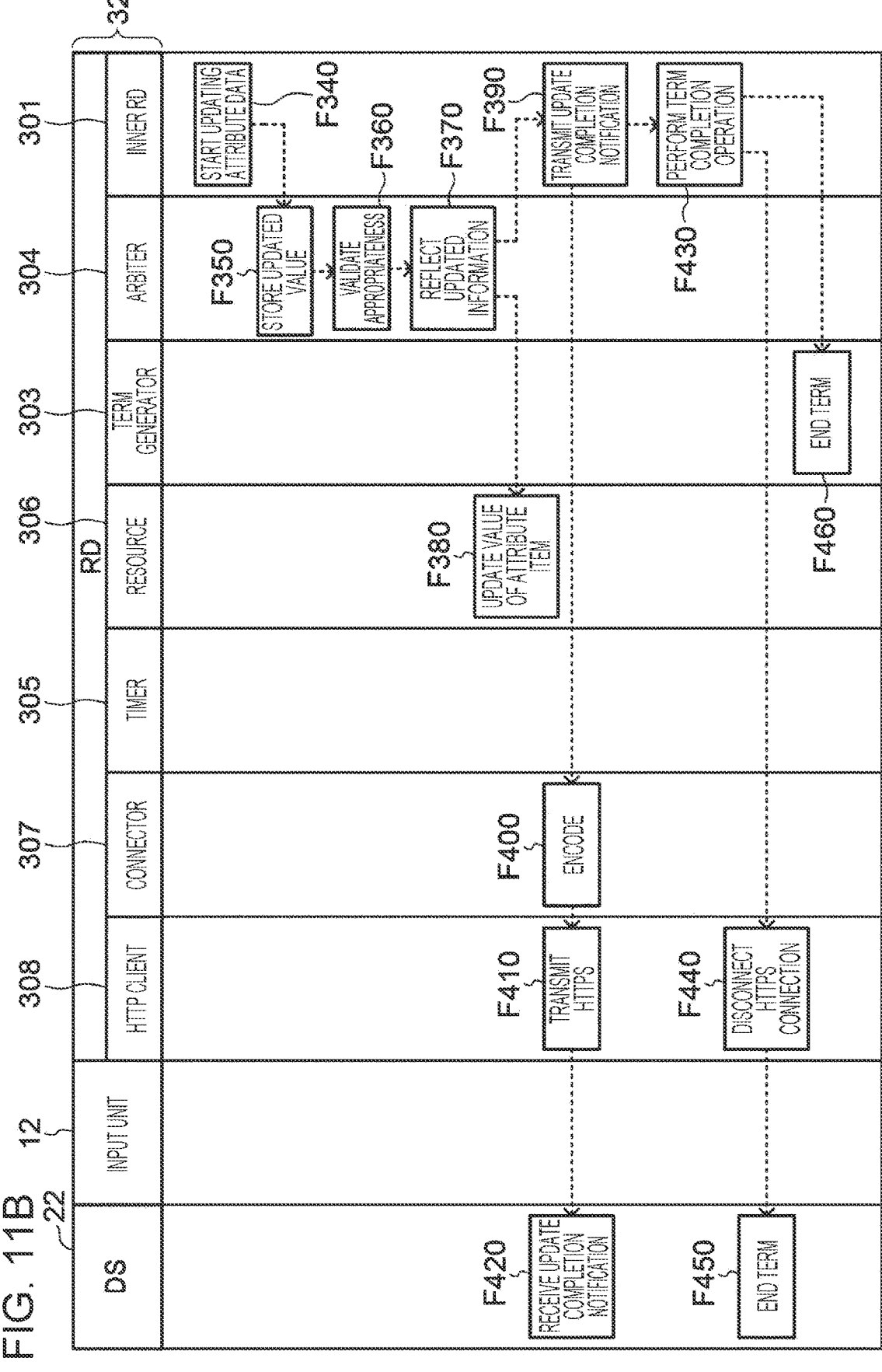
FIG. 11B is a sequence chart illustrating an example of a second half portion of the flow of data within the RD when the conflict occurs.

For convenience of explanation, the flow of the synchronization process in FIG. 10 is described also with reference to FIGS. 11A and 11B. FIGS. 11A and 11B are sequence charts illustrating the flow of data within the RD 32 in FIG. 3 when the synchronization process in FIG. 10 is performed. The input unit 12 in FIGS. 11A and 11B is the input unit 12 in the image forming apparatus 30. Operations in FIGS. 11A and 11B described with reference to FIG. 7 are not repeated.

When the image forming apparatus 30 receives from the nearby user the modification instruction of the value of an attribute item requested from the nearby user, the resource 306 updates an attribute item serving as a value modification target to a new value in step S10.

When the SC20 receives the modification instruction of the value of the attribute item from the remote user via the user terminal 10, the DS 22 updates an attribute item serving as a value modification target to a new value in step S100.

As previously described with reference to the synchronization process in FIG. 6, when the RD 32 starts the term, the synchronized connection is established between the DS 22 and RD 32. In step S120, the DS 22 receives the updated information from the RD 32 and performs an operation in step S122.

In step S122, the DS 22 performs a conflict determination as to whether a conflict has occurred on each attribute item contained in the updated information received in step S120 (F 300 in FIG. 11A).

Referring to FIG. 9, a conflict occurs in the attribute #2 and no conflict occurs in the attribute #3.

In step S124, the DS 22 updates the value of the attribute item in the metadata 24 in response to the determination results (F310 in FIG. 11A). Specifically, the value of the attribute item free from any conflict is updated in accordance with the updated information received in step S120.

In the case of the attribute item suffering from a conflict, the DS 22 references the contents of a priority order table 26 pre-stored on the non-volatile memory 44 in the computer 40 and then determines which value, the value updated by the DS 22 or the value updated by the RD 32, is to be set as the value of the attribute item.

FIG. 12 illustrates an example of the priority order table 26. Referring to FIG. 12, the priority order table 26 defines, on a per attribute item basis, a value each attribute item may take, and priority information representing which updated information, the updated information responsive to the modification instruction received from the user terminal 10 or the updated information received from the RD 32, is to be prioritized.

An attribute item "transport layer security" (TLS) setting in FIG. 12 may take options "Disabled," or "Enabled." "Prioritized DS," "Prioritized RD," "time stamp," "Fixed RD," or "Fixed DS" may be set for priority information. Check mark in the priority order table 26 in FIG. 12 signifies that a corresponding item is set. Referring to FIG. 12, the current value of the attribute item "TLS setting" is "Enabled," ad the current value of the priority information is "Prioritized DS."

When the DS 22 determines that a conflict occurs in the attribute item TLS setting, the DS 22 references the priority information on the attribute item "TLS setting" in the priority order table 26. If the prioritized DS is set in the priority information on the attribute item TLS setting, the value of the attribute item TLS setting updated by the DS 22 is prioritized.

If Prioritized RD is set in the priority information on the attribute item TLS setting, the value of the attribute item TLS setting updated by the RD 32 is prioritized. If the time stamp is set in the priority information on the attribute item TLS setting, the DS 22 prioritizes the value the attribute item TLS setting updated by the DS 22 or the value of the attribute item TLS setting updated by the RD 32, whichever represents relatively older time stamp, namely, the value of the TLS setting having received an earlier modification instruction.

If the fixed RD is set in the attribute item TLS setting, the remote user is inhibited from updating the value of the attribute item TLS setting. Specifically, the value of the attribute item may be modified only by the image forming apparatus 30. If the fixed DS is set in the priority information on the attribute item TLS setting, the nearby user is inhibited from updating the value of the attribute item TLS setting from the image forming apparatus 30. This signifies that the value of the attribute item is modifiable only via the user terminal 10.

A network administrator managing the service providing system 1 typically works via the Internet 2. It may be advisable that the prioritized DS or fixed DS is set in the attribute item related to a network, such as an IP address, managed by the network administrator. This may reduce the possibility of the following problem. If the IP address is designed to be set by a Dynamic Host Configuration Protocol (DHCP), devices connected to the LAN 5 are allocated with different IP addresses. If an IP address is changed on the image forming apparatus 30, the same IP address may be set on another device connected to the LAN 5.

Modification of hardware or replenishment of consumables, such as addition of a finisher or replenishment of paper sheets, on the image forming apparatus 30 are not performed via the Internet 2. For this reason, the fixed RD may be typically set in an attribute item indicating a physical configuration and a physical state of the image forming apparatus 30.

When the priority information is set to the prioritized DS and fixed DS at the attribute item suffering from the conflict, such as the attribute #2, in FIG. 9, the value of the attribute #2 is updated to B1. When the priority information is set to the prioritized RD, time stamp, and fixed RD, the value of the attribute #2 is updated to B2.

The prioritized RD is a first setting, the prioritized DS is a second setting, the time stamp is a third setting, the fixed DS is a fifth setting, and the fixed RD is a sixth setting.

The priority information is not limited to the examples described above. The priority information may be set to prioritize a value of an attribute item that corresponds to a later received modification instruction, in other words, the priority information may be set to prioritize the attribute item with the value thereof updated by the DS 22 or the attribute item with the value thereof updated by the RD 32, whichever corresponds to a time stamp representing relatively younger time. The priority information prioritizing the value of the attribute item corresponding to the later received modification instruction is an example of the fourth setting.

When the value of the attribute item updated by the DS 22 is prioritized in response to the priority information of the priority order table 26, different values on the attribute item may be set in the SC 20 and image forming apparatus 30. Referring to FIG. 9, for example, when the value of the attribute #2 is set to B1 in the conflict determination, the value of the attribute #2 is B1 on the SC20, and the value of the attribute #2 is B2 on the image forming apparatus 30. Synchronization is not established.

In step S135 in FIG. 10, the DS 22 transmits to the RD 32 the updated information on the attribute item having the value updated by the DS 22 out of the conflicting items (F320 in FIG. 11A).

In step S42 in FIG. 10, the HTTP client 308 of the RD 32 receives the updated information (F330 in FIG. 11A) and notifies the internal RD 301 that the updated information has been received from the DS 22. The internal RD 301 having received an updated information reception notification starts updating the attribute data on the image forming apparatus 30 (F340 in FIG. 11A).

In step S44 in FIG. 10, the internal RD 301 stores the updated information received in step S42 onto the downstream updates buffer 315 (see FIG. 3) (F350 in FIG. 11B). When the updated information is stored on the downstream updates buffer 315, the arbiter 304 validates appropriateness of the updated information (F360 in FIG. 11B). If the contents of the updated information are appropriate, the arbiter 304 updates the value of the attribute item notified by the updated information on the resource 306 to the value notified by the updated information (F370 and F380 in FIG. 11B).

Since the attribute data stored on the SC20 is synchronized with the attribute data stored on the image forming apparatus 30 in step S44, the internal RD 301 transmits to the DS 22 an update completion notification in step S46 (F390 in FIG. 11B). The update completion notification is encoded by the connector 307 (F400 in FIG. 11B) and the HTTP client 308 performs HTTPS transmission to the DS 22 (F410 in FIG. 11B).

In step S145 in FIG. 10, the DS 22 receives the update completion notification from the RD 32. Hereinafter, the process identical to the process starting with step S70 in the synchronization process in FIG. 6 is performed to disconnect the synchronized connection. The synchronization process in FIG. 10 thus ends. The sequence from F430 to F460 in FIG. 11B is identical to the sequence from F170 to F200 in FIG. 7 and the discussion thereof is thus omitted herein.

The service providing system 1 of the exemplary embodiment may establish the synchronization between the attribute data on the SC20 and the attribute data on the image forming apparatus 30 in the presence of a conflict. In such a case, the service providing system 1 performs the synchronization process by identifying which value, the value of the attribute item updated by the DS 22 or the value of the attribute item updated by the RD 32, to prioritize in accordance with the priority information defined in the priority order table 26 and by setting the value of the conflicting attribute item to the prioritized value.

The values of the attribute items updated by the DS 22 and RD 32 are synchronized in the next term. The synchronization timing of the attribute data is not limited to this timing. For example, the synchronization timing may be different timings on a per attribute item basis in accordance with characteristics of the attribute items of the DS 22 and RD 32.

FIG. 13 illustrates the attribute items that are managed by the DS 22 and RD 32 and divided according to update priority level.

Referring to FIG. 13, the attribute items are divided into update priority levels, namely, a priority level 1, priority level 2, and priority level 3.

The attribute item belonging to the priority level 1 is synchronized in the next term after being updated. The attribute item belonging to the priority level 2 is synchronized in the next term after the computer 40 forming the SC20 or the image forming apparatus 30 is started up. The attribute item belonging to the priority level 3 is synchronized in the next term after the modification instruction is received or after predetermined date and time pass.

The SC20 and image forming apparatus 30 may notify each other as earlier as possible that the value of an attribute item has been updated. The attribute items belonging to the priority level 1 include such an attribute, for example, an IP address and a remaining amount of toner. The attribute items belonging to the priority level 2 include an attribute item that involves in switching off and then on to modify status. Such an attribute may be an addition of a finisher or an addition of a network. The attribute items belonging to the priority level 3 include an attribute that is used after a predetermined job predetermined by date and time or a time period.

The synchronization process of the service providing system 1 has been described. Not all of the attribute items on the image forming apparatus 30 may be set as the synchronization target attribute items. For example, as the data size of an attribute item becomes larger, time and workload involved in the synchronization increase, and workload may be imposed on at least one of the CPU 41 in the computer 40 and the CPU 51 in the image forming apparatus 30. The values of multiple attribute items having a data size equal to or larger than a predetermined regular size and imposing workload on at least one of the CPU 41 in the computer 40 and the CPU 51 in the image forming apparatus 30 may be updated and the attribute items may be synchronized in the same term. Workload may increase temporarily in the term, possibly affecting other processes.

The attribute item having a data size equal to or larger than the regular size is not set as the synchronization target attribute item and may be separately updated regardless of the synchronization process of the term.

The remote user performs the function of the image forming apparatus 30. For example, in the setting function, the user terminal 10 individually sets the value of the attribute item as described below.

Figure 14:
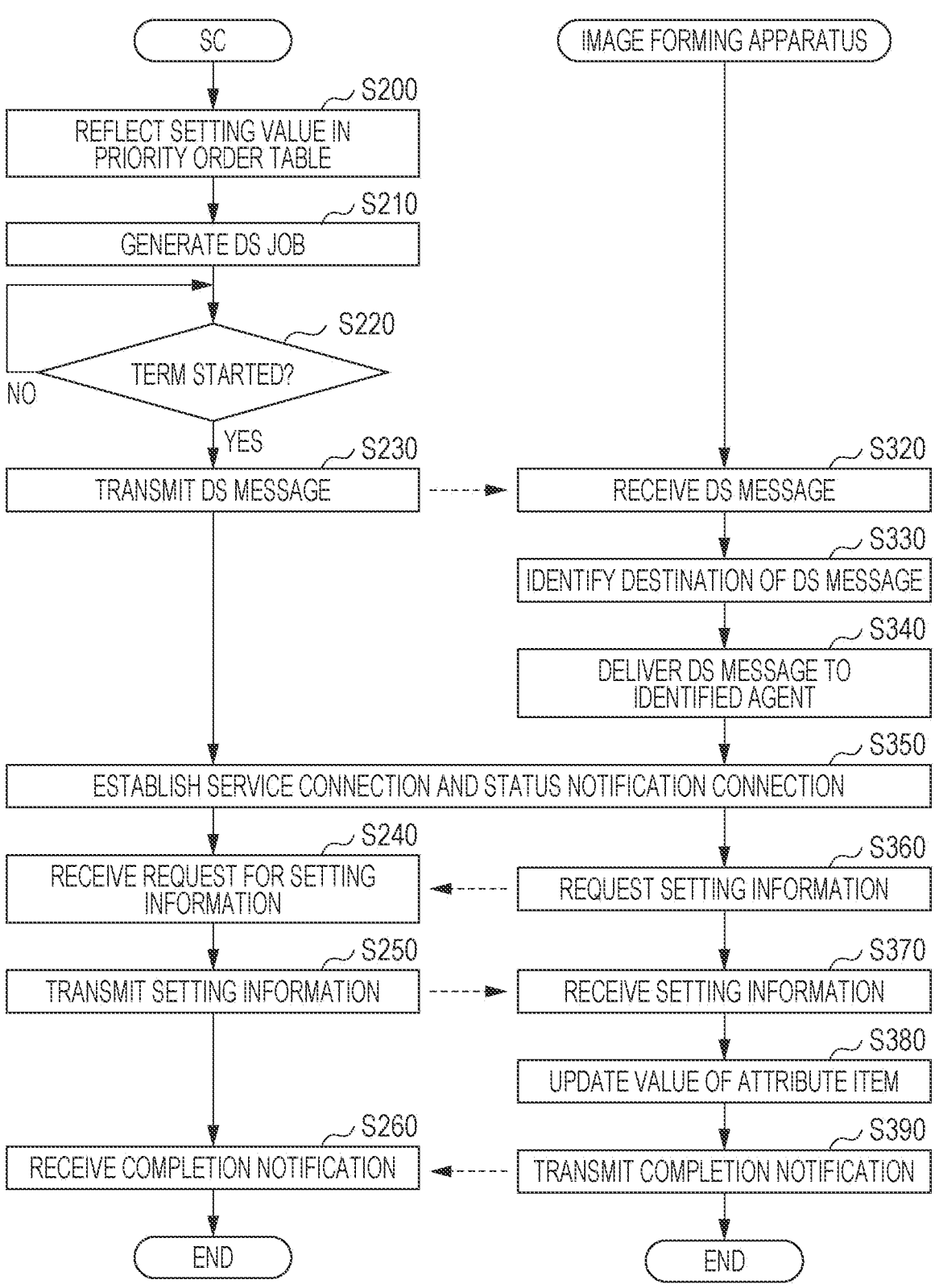
FIG. 14 is a flowchart illustrating an example of a flow of a setting process performed by the CPU of the image forming apparatus and the CPU of the computer forming the SC when the remote user has set a value of an attribute.

FIG. 14 is a flowchart illustrating an example of the flow of a setting process that is performed by the CPU 51 in the image forming apparatus 30 and the CPU 41 in the computer forming the SC20 when the remote user provides a setting instruction to set the value of the attribute item by operating the user terminal 10. The setting process to set the value of the attribute item is an example of the function of the image forming apparatus 30.

The image forming program of the image forming apparatus 30 defining the setting process is pre-stored on the non-volatile memory 54 in the image forming apparatus 30. The CPU 51 in the image forming apparatus 30 reads the image forming program from the non-volatile memory 54 and executes the setting process.

A server program of the computer 40 defining the setting process is pre-stored on the non-volatile memory 44 in the computer 40. The CPU 41 in the computer 40 reads the server program from the non-volatile memory 44 and performs the setting process.

Figure 15:
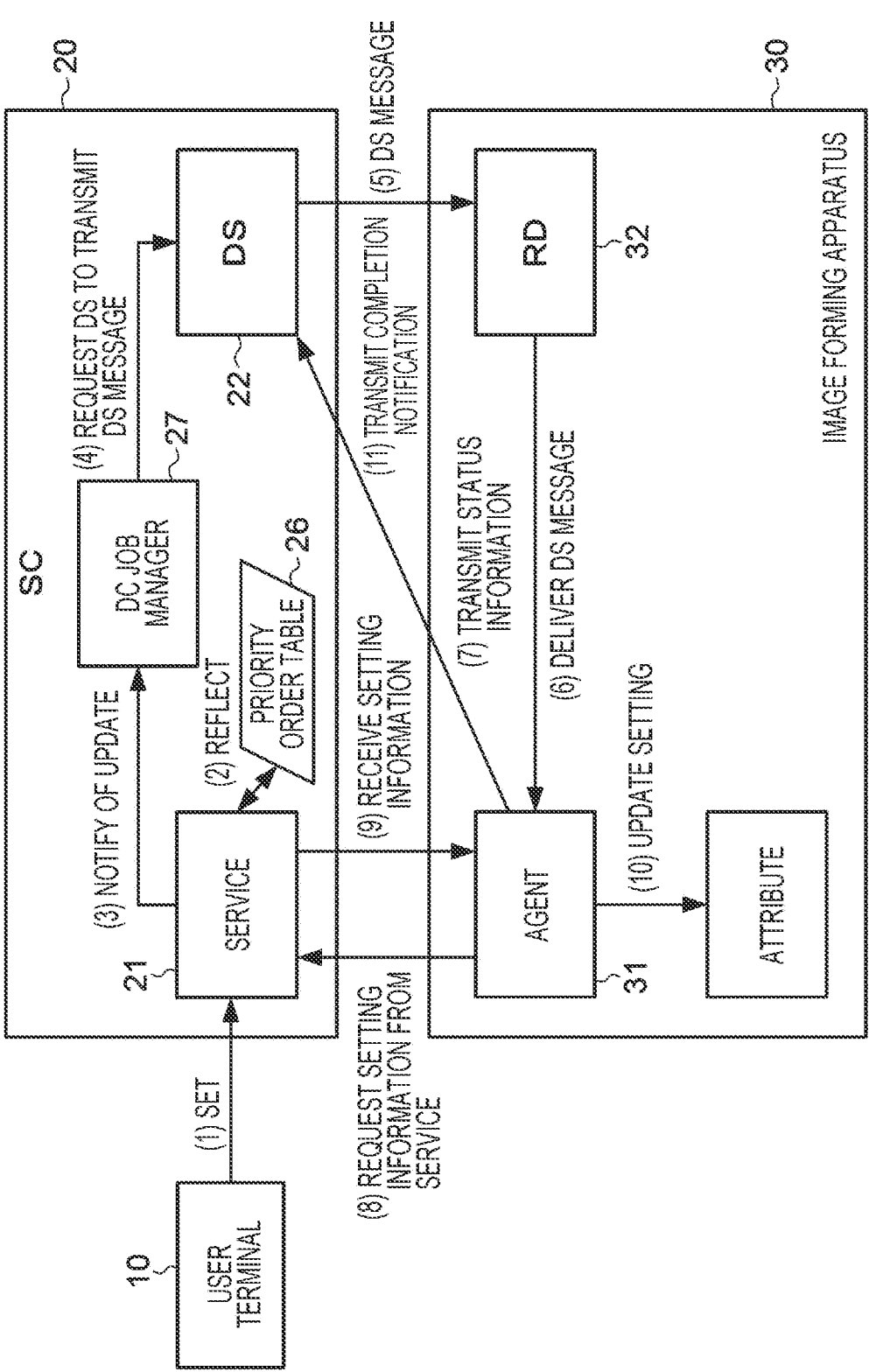
FIG. 15 is a sequence chart illustrating an example of the flow of data in the setting process originated at the remote user.

For convenience of explanation, the flow of the data in the setting process is described also with reference to FIG. 15. The operation of the functional blocks in the RD 32 has been described with reference to FIGS. 7, 11A and 11B. In the following discussion, the operation of the functional blocks in the RD 32 is described as the operation of the whole RD 32.

In step S200 in FIG. 14, the service 21 having received a setting instruction ((1) in FIG. 15) of a value of an attribute item requested from the user terminal 10 reflects the setting value of an attribute item instructed by the setting instruction on the priority order table 26 ((2) in FIG. 1f an instruction to set the values of an attribute item TLS setting to Enabled, and prioritized DS is received, the service 21 sets the value of the attribute item TLS setting to Enabled, and the priority information to the prioritized DS on the priority order table 26 illustrated in FIG. 12.

The service 21 notifies a DS job manager 27 of agent identification information that identifies an agent that performs on the image forming apparatus 30 a function indicated by the user terminal 10 in cooperation with the service 21. The service 21 also notifies the DS job manager 27 that the priority order table 26 has been updated ((3) in FIG. 15).

In step S210, the DS job manager 27 receives an update notification of the priority order table 26 from the service 21 and generates a DS job. The DS job is information representing instruction contents and is managed by the DS job manager 27. Specifically, the DS job manager 27 generates a DS job each time any instruction is received from the user terminal 10, and each DS job is associated with a job number identifying the DS job. The job number is an example of identification information identifying an instruction. The DS job manager 27 references the DS job and makes a transmission request to transmit a message that notifies the RD 32 that the user terminal 10 has provided an instruction to the DS 22 (in this case, an instruction to set the value of the attribute item) ((4) in FIG. 15). In this way, the message is registered on the DS 22. In the following discussion, a message, such as the instruction to set the value of the attribute item, is referred to as a DS message. The DS 22 uses the DS message to notify the RD 32 that an execution request of a function of the image forming apparatus 30 has been received.

The DS 22 attaches, to the DS message, access information used to connect to the service 21 having received an instruction from the agent 31 via the user terminal 10, agent identification information notified by the service 21, and the job number of the DS job for which the message transmission request of the DS message is made. The access information as an example of connection information is, for example, uniform resource locator (URL) identifying the service 21. The access information as an example of the connection information may include an access token serving as connection permit information that permits access and is issued by the service 21.

In order to set an attribute item serving as a setting instruction target to an instructed value on the image forming apparatus 30, the DS 22 transmits the produced DS message to the RD 32. Since the firewall 4 is arranged in the communication network 3 that connects the SC20 and image forming apparatus 30 as illustrated in FIG. 1, the DS 22 transmits the DS message to the RD 32 in the form of a response to a request from the RD 32. Specifically, the DS 22 and RD 32 perform polling communication originated at the RD 32.

Since the synchronization process is performed via the synchronized connection every predetermined period of time between the DS 22 and RD 32, the RD 32 performs polling to verify the presence or absence of the DS message during the term. If the DS 22 transmits the DS message in response, the RD 32 may acquire the DS message.

In step S220 in FIG. 14, the DS 22 determines whether a term is started. If a term is not yet started, the DS 22 repeats the operation in step S220, thereby monitoring the start of the term. If the term is started, the process proceeds to step S230.

During the term, the RD 32 performs the polling via the synchronized connection to verify the presence of the DS message. In step S230, the DS 22 transmits the registered DS message in response to the polling from the RD 32 ((5) in FIG. 15). The synchronized connection used to transmit the DS message is an example of a first connection.

In step S320, the RD 32 receives the DS message from the DS 22.

If the DS message is attached with the agent identification information, the RD 32 identifies, in step S330, the agent 31 represented by the agent identification information as a destination of the DS message acquired from the DS 22.

In step S340, the RD 32 delivers the DS message acquired from the DS 22 to the agent 31 identified in step S330 ((6) in FIG. 15). According to the exemplary embodiment, the RD 32 delivers the DS message acquired from the DS 22 to the agent 31 identified in step S330 ((6) in FIG. 15). According to the exemplary embodiment, the RD 32 thus delivers the DS message to the agent 31 that sets an attribute related to a network.

In step S350, the agent 31 having received the DS message references access information attached to the DS message and connects via the Internet 2 to a destination having the URL represented by the access information. In this case, the agent 31 may transmit an access token to the service 21 included in the DS message. The service 21 having received the execution instruction of the function from the user terminal 10 is connected to the agent 31 that executes the function instructed by the image forming apparatus 30. The link connecting the service 21 to the agent 31 is referred to as a "service connection." The service connection is an example of a second connection. By arranging at the firewall 4 a port that supports bidirectional communication, the bidirectional communication is performed in the service connection such that data may be transmitted at any timing from the service 21 or from the agent 31.

The agent 31, when connected to the service 21 in accordance with the received DS message, establishes a link to connect the agent 31 to the DS 22 in order to notify a DS job corresponding to the DS message of a process status. The link between the agent 31 and the DS 22 is referred to as a "status notification connection." The status notification connection is an example of a third connection. The setting of the firewall 4 provides one-way communication that permits transmission only in a direction from the agent 31 to the DS 22. However, the status notification connection permits the setting of the firewall 4 to provide bidirectional communication. The agent 31 identifies the DS 22 as a connection destination by simply referencing the URL of the DS 22 pre-stored on the non-volatile memory 54. The agent 31 notifies the DS 22 via the link of the status notification connection of status information that "connection to the service 21 is established" ((7) in FIG. 15). In this case, the agent 31 attaches, to the status information, the job number attached to the DS message received by the agent 31.

In step S360, the agent 31 requests, from the service 21 connected via the service connection, the setting information including information about the value of the attribute item the remote user has set using the user terminal 10 ((8) in FIG. 15).

In step S240, the service 21 receives the request for setting information. In step S250, the service 21 transmits the setting information to the agent 31, connected via the service connection, namely, a request source of the setting information ((9) in FIG. 15).

In step S370, the agent 31 receives the setting information, and updates the value of the attribute item in accordance with the contents of the received setting information in step S380. In this way, the values of the attribute item TLS setting on the image forming apparatus are set to Enabled and prioritized DS ((10) in FIG. 15).

The operation instructed by the DS message (setting of an attribute item) ends. In step S390, the agent 31 transmits, in step S390 to the DS 22 connected via the status notification connection, a completion notification notifying the completion of the process instructed by the DS message ((11) in FIG. 15). In this case, the agent 31 attaches to the completion notification the job number that is attached to the DS message received by the agent 31.

In step S260, the DS 22 receives the completion notification and notifies the DS job manager 27 of the received completion notification. The DS job manager 27 having received the completion notification has determined that the DS job associated with the job number attached to the completion notification is complete. The setting process in FIG. 14 is thus complete.

The functions of the image forming apparatus 30 are performed using the user terminal in the service providing system 1 of the exemplary embodiment in this way. The execution instruction of each function is received from the user terminal 10 via the service 21 and the DS 22 transmits to the RD 32 via the synchronized connection the DS message indicating that the execution instruction of the function has been received from the user terminal 10. Upon receiving the DS message, the RD 32 delivers the DS message to the agent 31 that performs the function, received by the service 21, in cooperation with the service 21. The agent 31 having received the DS message inquires the service 21, having received the execution instruction of the function, of execution contents via the service connection and performs the instructed function in accordance with the execution contents acquired from the service 21. The agent 31 notifies the DS 22 of the status of the process via the status notification connection. The process that the remote user has requested via the service 21 is thus performed by the image forming apparatus 30.

In the setting process illustrated with reference to FIG. 14, using the user terminal 10, the remote user provides the setting instruction to set the value of the attribute item on the image forming apparatus 30. Alternatively, the nearby user may set the value of the attribute item on the image forming apparatus 30.

In an operation example where the setting function sets the value of the attribute item on the image forming apparatus 30, the nearby user performs the function of the image forming apparatus 30 as described below. Specifically, an example where the value of the attribute item on the image forming apparatus 30 conflicts with the SC20 is described as below.

Figure 16:
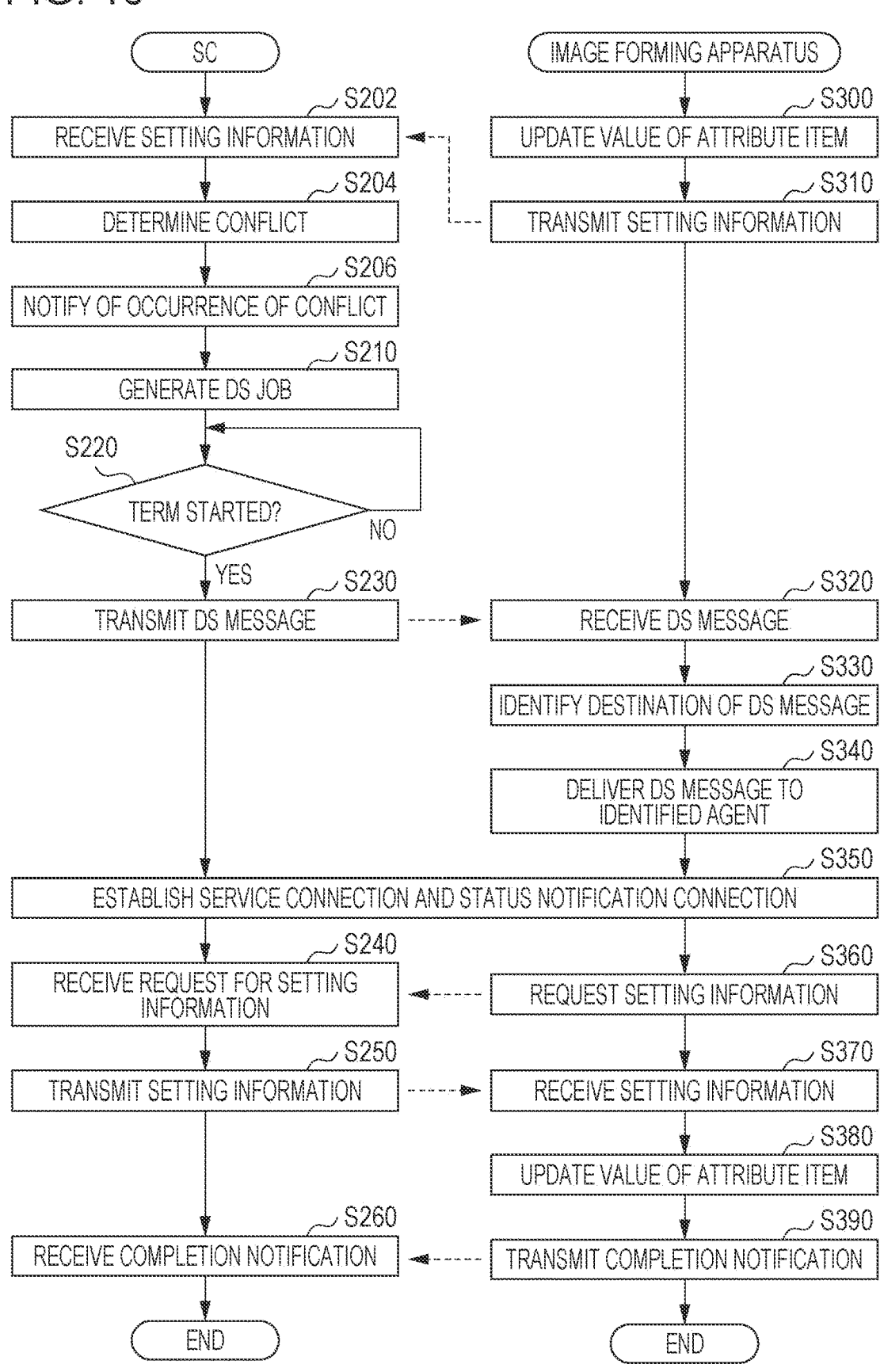
FIG. 16 is a flowchart illustrating an example of the flow of the setting process performed by CPU of the image forming apparatus and the CPU of the computer forming the SC when the nearby user has set the value of the attribute.

FIG. 16 is a flowchart illustrating an example of the flow of the setting process performed by the CPU 51 in the image forming apparatus 30 and the CPU 41 in the computer forming the SC20. The setting process is performed when the nearby user operates the image forming apparatus 30 and thus provides the setting instruction to set a value of an attribute item, involving the verification of the value, out of the attribute items of the image forming apparatus 30.

Figure 17:
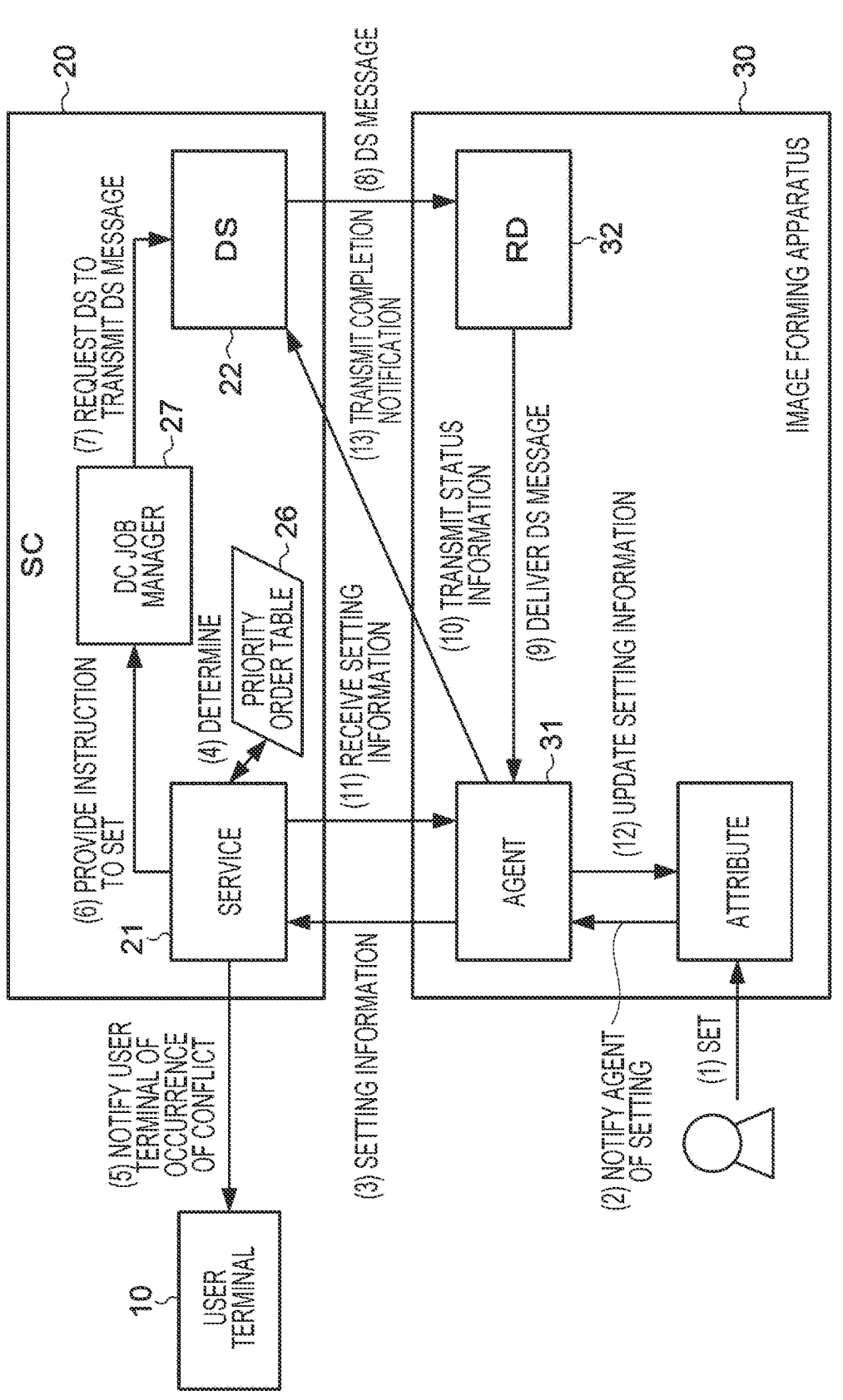
FIG. 17 is a sequence chart illustrating an example of the flow of data in the setting process originated at the nearby user.

For convenience of explanation, the flow of data in the setting process is described also with reference to FIG. 17. The operation of the functional blocks in the RD 32 has already described with reference to FIGS. 7, 11A, and 11B. In the discussion of the setting process in FIG. 16, the operation of the functional blocks forming the RD 32 is described as the operation of the whole RD 32. The following discussion is based on the assumption that the service connection has been established between the agent 31 and service 21.

In step S300 in FIG. 16, if the nearby user sets the value of the attribute item ((I) in FIG. 17), the system 33 updates the value of the attribute item to the setting value. If the value of the attribute item is set, the system 33 detects the setting of the value to an attribute item that the agent 31 in charge of a value setting function has performed ((2) in FIG. 17). The system 33 generates the setting information including information on what value is set to which attribute item by the nearby user. The setting of the value of the attribute item may include modifying the value of the attribute item.

In step S310, the agent 31 transmits the setting information to the service 21 via the service connection established with the service 21. Together with the agent 31, the service 21 provides the remote user with service in cooperation with the function of the image forming apparatus 30. The setting information transmitted from the agent 31 is attached with an agent identification number of the agent 31 having transmitted the setting information. If the service connection is not established, the agent 31 establishes the service connection with the service 21 that receives the setting instruction of the value of the attribute item from the user terminal 10. The URL of the service 21 associated with each agent 31 may be a URL preset by a network administrator or a URL the network administrator provides each time the service connection is established. With the service connection established between the agent 31 and the service 21 in the past, a URL stored on the non-volatile memory 54 may be used as log information.

In step S202, the service 21 receives the setting information from the agent 31. The service 21 having received the setting information references the priority order table 26 for the value of the attribute item represented by the setting information.

It may now be assumed that the value of the attribute item TLS setting in the metadata 24 is Enabled while the setting information includes information that sets the value of TLS setting to Disabled. On the other hand, referencing the priority order table 26 may indicate that the fixed DS is set in the priority information on the attribute item TLS setting. In such a case, the nearby user is inhibited from setting the value of the attribute item and a conflict with a higher priority occurs. Referencing the update priority level indicates that the TLS setting is "Priority level 1: set in next term."

In step S204, the service 21 performs the conflict determination that determines whether a conflict occurs in the setting information received from the agent 31 ((4) in FIG. 17). If a conflict is detected, the service 21 transmits, in step S206, a conflict occurrence notification to the user terminal loused by the network administrator via the Internet 2. The conflict occurrence notification notifies the user terminal 10 of the occurrence of the conflict and the priority level of an attribute item suffering from the conflict. The network administrator may recognize that an operation not permitted in the service providing system 1 has been performed. In this example, the service 21 provides the user terminal 10 with the notification that the TLS setting serving as an example of an attribute item on the image forming apparatus 30 is changed to Disabled on the image forming apparatus 30 and the notification that an attribute item serving as a conflict target has a higher priority level and is to be processed earlier.

If a conflict occurs with the metadata managed by the SC20 and unmatching the value of the attribute item on the image forming apparatus 30, the service 21 performs an operation to set, to a correct value, the value of the attribute item on the image forming apparatus 30 suffering from the conflict. This situation is that the value of the attribute item TLS setting on the image forming apparatus 30 is set to Disabled while the value of the attribute item TLS setting in the metadata managed by the SC20 is set to Enabled in. The value of the attribute item TLS setting on the image forming apparatus 30 is to set to Enabled.

In step S210, the DS job manager 27 receives the setting instruction from the service 21 and generates the DS job that sets the value of the specified attribute item ((6) in FIG. 17). The DS job manager 27 requests the DS 22 to transmit the DS message that notifies the RD 32 of the setting instruction of the value of the attribute item ((7) in FIG. 17).

In step S220, the DS 22 determines whether a term is started. If the term is not started, the DS 22 monitors the start of the term by repeating the operation in step S220. If the term is started, the process proceeds to step S230.

In step S230, the DS 22 transmits a registered DS message to the RD 32 in response to polling from the RD 32 ((8) in FIG. 17).

The DS message transmitted from the DS 22 to the RD 32 may simply include the agent identification information on the agent 31 having transmitted the setting information and the job number of the DS job for which the DS message transmission request has been made.

The RD 32 in turn performs the operations in steps S320 through S340 illustrated in FIG. 14 and delivers the DS message to the agent 31 that has detected the setting operation of an attribute item ((9) in FIG. 17).

The agent 31 having received the DS message performs the operations in steps S350 through S380 illustrated in FIG. 14, notifies the DS job of a process status via the status notification connection established with the DS 22 ((10) in FIG. 17), acquires, from the service 21 via the service connection established with the service 21, the setting information of an attribute item, and updates the value of the attribute item on the image forming apparatus 30 in accordance with the setting information ((11) and (12) in FIG. 17). The agent 31 having completed the instructed process performs the operation in step S390 in FIG. 14 and thus transmits a completion notification to the DS 22 ((13) in FIG. 17).

The value of the TLS setting as an attribute item set as being Disabled on the image forming apparatus 30 is reverted back to Enabled. The value the attribute item TLS setting on the metadata 24 matches the value of the attribute item TLS setting on the image forming apparatus 30. The setting process in FIG. 16 thus ends.

If the agent 31 receives the DS message from the service 21 having transmitted the setting information, the agent 31 determines that a conflict has occurred. The agent 31 may skip the operations in steps S360 and S370 in FIG. 16 without requesting the setting information from the service 21 and thus reverts the value of the attribute item set in step S300 in FIG. 16 back to an original value prior to the setting. As described above, in step S210 in FIG. 16, the service 21 has requested the DS job manager 27 to generate the DS job that sets the value of the specified attribute item. Alternatively, the service 21 may causes the agent 31 via the service connection to modify the setting by transmitting the setting instruction of the value of the attribute item.

Depending on the function instructed by the image forming apparatus 30, the service providing system 1 of the exemplary embodiment notifies the SC20 of appropriate information via the service connection regardless of the term.

A service 21 not included in the SC20 is present over the cloud service. The service providing system 1 of the exemplary embodiment may provide the function of the image forming apparatus 30 to the Internet 2, using not only the service 21 included in the SC20 provided by the developer of the image forming apparatus 30 (referred to as a native service 21) but also the service 21 provided by a third party (referred to as an external service 21).

The synchronization process and setting process of the service providing system 1 have been described. The service 21 provided as the cloud service by the SC20 includes the service 21 in which image data specified by the remote user is printed on the image forming apparatus 30.

When the service 21 receives the image data serving a print target from the remote user, the SC20 notifies the image forming apparatus 30 that the image data has been received and the SC20 performs a print operation in cooperation with the image forming apparatus 30.

A process of the service providing system 1 where the service 21 provided by the third party prints the image data is described below.

FIG. 18 is a sequence chart illustrating the flow of data in the service providing system 1 when the image data has been received from the user terminal 10. In an example, the service 21 receiving the image data from the user terminal 10 (referred to as a "print service 21") is the external service 21 but also may be the native service 21.

When the user terminal 10 transmits the image data to the print service 21 ((1) in FIG. 18), a user identification (ID) of the remote user having transmitted the image data and the image data are registered in association with each other onto the print service 21. The user ID is identification information that is issued in advance to each user to identify the user when the service providing system 1 is used at first.

When the service 21 having registered the image data notifies the DS job manager 27 that the registration instruction of the image data has been provided, the DS job manager 27 generates the DS job ((2) in FIG. 18).

The DS job manager 27 requests the DS 22 to transmit the DS message that notifies the RD 32 that the image data has been registered ((3) in FIG. 18). As previously described, the DS message is attached with the access information used to connect to the service 21 having the registered image data, agent identification information used to perform the print function, and job number of the DS job managing the print process of the registered image data.

The RD 32 acquires the DS message from the DS 22 via the polling performed during the term ((4) in FIG. 18), and delivers the DS message to the agent 31 represented by the agent identification information attached to the DS message ((5) in FIG. 18).

The agent 31 having received the DS message establishes the service connection with the service 21 by referencing the access information attached to the DS message ((6) in FIG. 18).

The remote user having registered the image data on the service 21 moves from the user terminal 10 to the installation location of the image forming apparatus 30 and then enters, as the nearby user, the user ID of the remote user to the input unit 12 in the communication network 3 (this operation is referred to as user authentication). The user authentication is performed on the image forming apparatus 30 and if the entered user ID has been registered, the image forming apparatus 30 may continue to receive an operation on the input unit 12 ((7) in FIG. 18).

If the image forming apparatus 30 has successfully completed the user authentication, the image forming apparatus 30 displays on the display 13 a list of functions available from the image forming apparatus 30. When the nearby user selects a function to be used from the list of the available function (the print function using the service 21 is selected herein), the RD 32 notifies a print instruction having the user ID of the nearby user in service to the agent 31 that is to perform the function of the service 21((8) in FIG. 18).

The agent 31 having received the print instruction acquires, from the service 21 via the service connection, a list of the image data that is associated with the user ID attached to the print instruction ((9) in FIG. 18). The agent 31 displays the list of the image data on the display 13 in the image forming apparatus 30.

If the nearby user selects image data from the list of the image data, the RD 32 notifies an selection instruction notifying of the selected image data to the agent 31 that is perform the function of the service 21 ((10) in FIG. 18).

Upon receiving the selection instruction, the agent 31 acquires the selected image data from the service 21 via the service connection ((11) in FIG. 18), and prints the acquired image data. When the agent 31 transmits a print completion notification to the DS 22 via the status notification connection after completing the printing of the image data ((12) in FIG. 18), the DS job managing the printing of the image data is deleted. As previously described, the agent 31 having established the service connection with the service 21 may establish the status notification connection with the DS 22 and notify the DS 22 of status information that "connection has been established with the service 21."

When the image data is printed using the service 21, the image forming apparatus 30 may complete, with the nearby user successfully authenticated, the acquisition preparation of the image data registered on the service 21. The service connection to connect the service 21 and agent 31 may thus be established before the user authentication of the nearby user is performed on the image forming apparatus 30.

The configuration of the service providing system 1 has been described with reference to the execution of the function of the image forming apparatus 30. Apparatuses to which the service providing system 1 provide service are not limited to the image forming apparatus 30. For example, any apparatuses that are connectable to the Internet 2 and enabled to change contents of operation in response to an instruction from the user may be applied to the service providing system 1. Such apparatuses may include monitoring cameras, consumer electronics, or moving bodies, such as vehicles.

The service providing system 1 has been described with reference to the exemplary embodiment. The service providing system 1 has been described for exemplary purposes only and the example of the service providing system 1 does not limit the scope of the described exemplary embodiment. A variety of changes and modifications are possible to the exemplary embodiment without departing from the scope of the present disclosure. Modified or changed embodiments may also fall within the technical scope of the present disclosure. For example, without departing from the scope of the present disclosure, the synchronization process illustrated in FIGS. 6, 8, and 10 may be modified and the order of internal operations in the setting process illustrated in FIGS. 14 and 16 may be modified.

Referring to FIG. 17, the DS job is generated and delivered via the synchronized connection serving as a path through which communication is periodically performed at synchronization intervals in order to clear a conflict of values of an attribute item. A variety of information may be transmitted via a path or a service connection that allows the value of the attribute item modified in setting by the image forming apparatus 30 to be notified to the SC20 without delay as soon as the notification is performed. In this case, the setting information may be transmitted more quickly to the image forming apparatus 30 than when the synchronized connection is used.

Referring to FIGS. 16 and 17, the value of the attribute item set by the nearby user is reflected on the system 33 and then the set value of the attribute item is notified to the SC20. Alternatively, the value of the attribute item set by the nearby user may be temporarily stored without being reflected on the system 33. The stored setting is notified from the agent 31 to the SC20 via the service connection. In the following process in the same way as previously described, the service 21 makes a determination in accordance with the priority order table 26 and the image forming apparatus 30 receives the determination results from the service 21 via the synchronized connection. If the determination results received from the SC20 indicate an update permit that permits the value of the attribute item to be updated, the agent 31 may reflect on the system 33 the value of the attribute item set by the nearby user for the first time.

In the example illustrated in FIGS. 15 through 17, the setting information is transmitted between the image forming apparatus 30 and SC20 via the service connection.

Alternatively, the setting information may be transmitted using only the service connection without using communication via the service connection.

In the example illustrated in FIGS. 15 and 17, the SC20 has the priority order table 26. The image forming apparatus 30 may also have the same priority order table 26 as the priority order table 26 on the SC20. If the image forming apparatus 30 has the priority order table 26, the image forming apparatus 30 may identify the data prioritized by the SC20. The image forming apparatus 30 may put on hold the reception of the setting information with the prioritized DS and prioritized time stamp set as the priority information, out of the received setting information, and may process the setting information after the synchronization process is performed. When the image forming apparatus 30 receives the setting information with the fixed DS set as the priority information, the image forming apparatus 30 may end the process without reflecting the setting information on the system 33. When the image forming apparatus receives the setting information with the prioritized RD or the fixed RD set as the priority information, the image forming apparatus 30 may reflect the setting information on the system 33 immediately. The priority order table 26 is subject to modification. Each time the priority order table 26 is modified, the SC20 transmits the priority order table 26 to the image forming apparatus 30 via the synchronized connection and service connection. The consistency of the priority order table 26 is thus maintained between the SC20 and image forming apparatus 30.

According to the exemplary embodiment described above, each process is implemented using software. Alternatively, the processes described in the flowcharts illustrated in FIGS. 6, 8, 14, and 16 may be implemented using hardware. In such a case, higher processing speed may be available than when the processes are implemented using software.

In the exemplary embodiment above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the exemplary embodiment above, the term "processor" is broad enough to encompass one processor or plural processors in collaboration which are located physically apart from each other but may work cooperatively. The order of operations of the processor is not limited to one described in the embodiments above, and may be changed.

In the exemplary embodiment above, the programs are stored on the non-volatile memories 44 and 54. The storage destination of the programs is not limited to the non-volatile memories 44 and 54. The programs may be delivered in a recorded form on a recording medium readable by the computers 40 and 50. For example, the programs may be delivered in a recorded form on an optical disk, such as a compact disk read-only memory (CD-ROM) or digital versatile disk read-only memory (DVD-ROM). The programs may be delivered in a recorded form on a semiconductor memory, such as a universal serial bus (USB) memory or memory card. The programs may be delivered in a recorded form on the ROMs 42 and 52. The ROMs 42 and 52, non-volatile memory 44, non-volatile memory 54, CD-ROM, DVD-ROM, USB memory, and memory card are examples of a non-transitory computer readable recording medium.

The image forming apparatus 30 and computer 40 may download the programs from an external apparatus (not illustrated) via the Internet 2 and store the downloaded programs onto a recording device. In this case, the CPU 51 in the image forming apparatus 30 reads from the recording device the image forming program downloaded from the external apparatus and performs a variety of processes, and the CPU 41 in the computer 40 reads from the recording device the server program downloaded from the external apparatus and performs a variety of processes.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

A service providing system including:

a first apparatus that stores first attribute data including status information on the first apparatus and setting information on a function of the first apparatus, updates the first attribute data to contents specified by a modification instruction of the first attribute data if the modification instruction of the first attribute data is received from a user, and establishes synchronization via a first connection such that, in a second apparatus storing second attribute data corresponding to the first attribute data, contents of the second attribute data become identical to contents of the updated first attribute data; and the second apparatus that, if a modification instruction of the second attribute data is received from a user, updates the second attribute data to contents specified by the modification instruction of the second attribute data, and establishes synchronization via the first connection such that, in the first apparatus, contents of the first attribute data become identical to contents of the updated second attribute data, wherein if the contents of the first attribute data updated in response to the modification instruction received by the first apparatus are different, before the synchronization, from the contents of the second attribute data updated in response to the modification instruction received by the second apparatus, attribute data to be prioritized is identified by referring to priority information defining which attribute data, the first attribute data or the second attribute data, is to be prioritized, and the first apparatus and the second apparatus establish the synchronization via the first content such that the first attribute data and the second attribute data are updated to contents of the attribute data to be prioritized.

(((2)))

In the service providing system according to (((2))), the priority information defines on each piece of the attribute data a first setting that prioritizes the first attribute data, a second setting that prioritizes the second attribute data, a third setting that prioritizes the first attribute data or the second attribute data, whichever receives the modification instruction earlier, a fourth setting that prioritizes the first attribute data or the second attribute data, whichever receives the modification instruction later, a fifth setting that inhibits updating in response to the first attribute data, or a sixth setting that inhibits updating in response to the second attribute data.

(((3)))

In the service providing system according to (((2))), the fifth setting is defined for attribute data related to a network connected to the first apparatus and the sixth setting is defined for attribute data related to a hardware configuration of the first apparatus.

(((4)))

In the service providing system according to one of (((1))) through (((3))), the first apparatus and the second apparatus establish the synchronization between the first attribute data and the second attribute data during a synchronization period that starts at every predetermined time interval.

In the service providing system according to (((4))), if the first apparatus and the second apparatus are unable to establish the synchronization between the first attribute data and the second attribute data during the synchronization period, the first apparatus and the second apparatus do not retry the synchronization between the first attribute data and the second attribute data during the synchronization period, but establish the synchronization between the first attribute data and the second attribute data during a next synchronization period.

(((6)))

In the service providing system according to one of (((1))) through (((5))), the first apparatus and the second apparatus adjust a synchronization timing between the first attribute data and the second attribute data by referencing update information that defines the synchronization timing for each piece of attribute data.

(((7)))

In the service providing system according to one of (((1))) through (((6))), the first apparatus includes a cooperation unit that is connected via a second connection to a service component on a network receiving an execution instruction of a function of the first apparatus and cooperates with the second apparatus, wherein the first apparatus and the second apparatus establishes the synchronization between the first attribute data and the second attribute data by acquiring the first attribute data or the second attribute data via the second connection, related to a predetermined type of attribute data.

(((8)))

In the service providing system according to (((7))), the predetermined type of attribute data has a data size equal to or larger than a regular size.

(((9)))

In t the service providing system according to (((7))), the first apparatus transmits the first attribute data to the second apparatus via the second connection before updating the first attribute data to the contents specified by the modification instruction, and updates the first attribute data if determination results about the first attribute data that have been received from the second apparatus via the first connection in accordance with the synchronization established between the first apparatus and the second apparatus are an update permit.

28

(((10)))

In the service providing system according to (((7))), the first apparatus transmits the first attribute data to the second apparatus via the second connection and updates the first attribute data in accordance with setting information, on the first attribute data, received from the second apparatus via the first connection.

(((11)))

In the service providing system according to (((7))), the first apparatus and the second apparatus establishes the synchronization between the first attribute data and the second attribute data via the first connection if the contents of the first attribute data are different from the contents of the second attribute data in terms of an attribute that is lower in an update priority level than a preset criterion and establishes the synchronization between the first attribute data and the second attribute data via the second connection if the contents of the first attribute data are different from the contents of the second attribute data in terms of an attribute that is equal to or higher in the update priority level than the preset criterion.

What is claimed is:
1. A service providing system comprising:
a first apparatus that
stores first attribute data defining an attribute item and a first value associated with the attribute item, the first attribute data representing status information on the first apparatus and setting information on a function of the first apparatus,
updates the first value to a new value for the attribute item in the first attribute data in response to receiving a modification instruction from a user,
establishes a first connection with a second apparatus storing second attribute data corresponding to the first attribute data, the second attribute data defining the attribute item and a second value associated with the attribute item, and
performs synchronization via the first connection so that the new value in the first attribute data and the second value in the second attribute data become identical,
wherein, upon determining, before the synchronization, that the new value in the first attribute data is different from the second value in the second attribute data, at least one of the first apparatus or the second apparatus refers to priority information defining which one of the first attribute data or the second attribute data, is to be prioritized, and the synchronization is performed so that, if the first attribute data is to be prioritized, the second value is updated to the new value, and if the second attribute data is to be prioritized, the new value is updated to the second value.
2. The service providing system according to claim 1, wherein the priority information defines one of:
a first setting that prioritizes the first attribute data,
a second setting that prioritizes the second attribute data,
a third setting that prioritizes the first attribute data or the second attribute data, whichever receives the modification instruction earlier,
a fourth setting that prioritizes the first attribute data or the second attribute data, whichever receives the modification instruction later,
a fifth setting that inhibits updating in response to the first attribute data, or
a sixth setting that inhibits updating in response to the second attribute data.

3. The service providing system according to claim 2, wherein the fifth setting is defined for attribute data related to a network connected to the first apparatus and the sixth setting is defined for attribute data related to a hardware configuration of the first apparatus.

4. The service providing system according to claim 1, wherein the first apparatus and the second apparatus establish the synchronization between the first attribute data and the second attribute data during a synchronization period that starts at every predetermined time interval.

5. The service providing system according to claim 4, wherein if the first apparatus and the second apparatus are unable to establish the synchronization between the first attribute data and the second attribute data during the synchronization period, the first apparatus and the second apparatus do not retry the synchronization between the first attribute data and the second attribute data during the synchronization period, but establish the synchronization between the first attribute data and the second attribute data during a next synchronization period.

6. The service providing system according to claim 1, wherein the first apparatus and the second apparatus adjust a synchronization timing between the first attribute data and the second attribute data by referencing update information that defines the synchronization timing for each piece of attribute data.

7. The service providing system according to claim 1, wherein the first apparatus includes a cooperation unit that is connected via a second connection to a service component on a network receiving an execution instruction of a function of the first apparatus and cooperates with the second apparatus, and wherein the first apparatus and the second apparatus establish the synchronization between the first attribute data and the second attribute data by acquiring the first attribute data or the second attribute data, via the second connection, related to a predetermined type of attribute data.

8. The service providing system according to claim 7, wherein the predetermined type of attribute data has a data size equal to or larger than a regular size.

9. The service providing system according to claim 7, wherein the first apparatus transmits the first attribute data to the second apparatus via the second connection before updating the first attribute data in response to the modification instruction, and updates the first attribute data upon determining that a result received from the second apparatus via the first connection in accordance with the synchronization established between the first apparatus and the second apparatus indicates an update permit.

10. The service providing system according to claim 7, wherein the first apparatus transmits the first attribute data to the second apparatus via the second connection and updates the first attribute data in accordance with setting information, on the first attribute data, received from the second apparatus via the first connection.

11. The service providing system according to claim 7, wherein the first apparatus and the second apparatus establish the synchronization between the first attribute data and the second attribute data via the first connection if contents of the first attribute data are different from contents of the second attribute data in terms of an attribute that is lower in an update priority level than a preset criterion and establishes the synchronization between the first attribute data and the second attribute data via the second connection if contents of the first attribute data are different from contents of the second attribute data in terms of an attribute that is equal to or higher in the update priority level than the preset criterion.

* * * * *